(12) United States Patent
Frye et al.

(10) Patent No.: US 10,059,232 B2
(45) Date of Patent: Aug. 28, 2018

(54) VEHICLE SEAT

(71) Applicant: FAURECIA AUTOMOTIVE SEATING, LLC, Troy, MI (US)

(72) Inventors: Dale J. Frye, West Olive, MI (US); Jeffery T. Bonk, Chesterfield, MI (US); Christopher L. Hogg, Holland, MI (US); Adam M. Deck, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/126,047

(22) PCT Filed: Mar. 30, 2015

(86) PCT No.: PCT/US2015/023294
§ 371 (c)(1),
(2) Date: Sep. 14, 2016

(87) PCT Pub. No.: WO2015/149059
PCT Pub. Date: Oct. 1, 2015

(65) Prior Publication Data
US 2017/0166094 A1   Jun. 15, 2017

Related U.S. Application Data

(60) Provisional application No. 61/970,678, filed on Mar. 26, 2014.

(51) Int. Cl.
*B60N 2/12* (2006.01)
*B60N 2/06* (2006.01)
(Continued)

(52) U.S. Cl.
CPC ............... *B60N 2/123* (2013.01); *B60N 2/06* (2013.01); *B60N 2/08* (2013.01); *B60N 2/0837* (2013.01);
(Continued)

(58) Field of Classification Search
CPC . B60N 2/123; B60N 2/06; B60N 2/08; B60N 2/0837
See application file for complete search history.

(56) References Cited

U.S. PATENT DOCUMENTS 5,547,159 A * 8/1996 Treichl ................. B60N 2/0705
  248/419
7,667,345 B2  2/2010 Budweg et al.
(Continued)

FOREIGN PATENT DOCUMENTS

FR     839713 A    4/1939
FR   2910394 A1    6/2008
(Continued)

OTHER PUBLICATIONS

PCT Search Report and Written Opinion completed by the ISA/EP dated Jun. 12, 2015 and issued in connection with PCT/US2015/023294.

(Continued)

*Primary Examiner* — Michael Dean Lang
(74) *Attorney, Agent, or Firm* — Barnes & Thornburg LLP

(57) ABSTRACT

A vehicle seat includes a seat bottom and a seat back coupled to the seat bottom to extend upwardly away from the seat bottom. The vehicle seat further includes a seat-bottom foundation arranged to interconnect the seat bottom and seat back to translate back and forth relative to a vehicle floor.

26 Claims, 26 Drawing Sheets

(51) Int. Cl.
  *B60N 2/08* (2006.01)
  *B60N 2/16* (2006.01)
  *B60N 2/18* (2006.01)
  *B60N 2/42* (2006.01)

(52) U.S. Cl.
  CPC ......... *B60N 2/0862* (2013.01); *B60N 2/0881* (2013.01); *B60N 2/16* (2013.01); *B60N 2/18* (2013.01); *B60N 2/42* (2013.01)

(56) References Cited

U.S. PATENT DOCUMENTS

2007/0001498 A1    1/2007  Bauersachs
2010/0026070 A1*   2/2010  Rohee ................. B60N 2/0248
                                                    297/344.1
2013/0320729 A1   12/2013  Cooley et al.

FOREIGN PATENT DOCUMENTS

FR    2924066 A1    5/2009
WO   97003861 A1    2/1997

OTHER PUBLICATIONS

Chinese Office Action for Chinese App. No. 201580015981.X sent on May 14, 2018, 3638 CN ||(No English translation of the office available, only a summary), 11 pages.

* cited by examiner

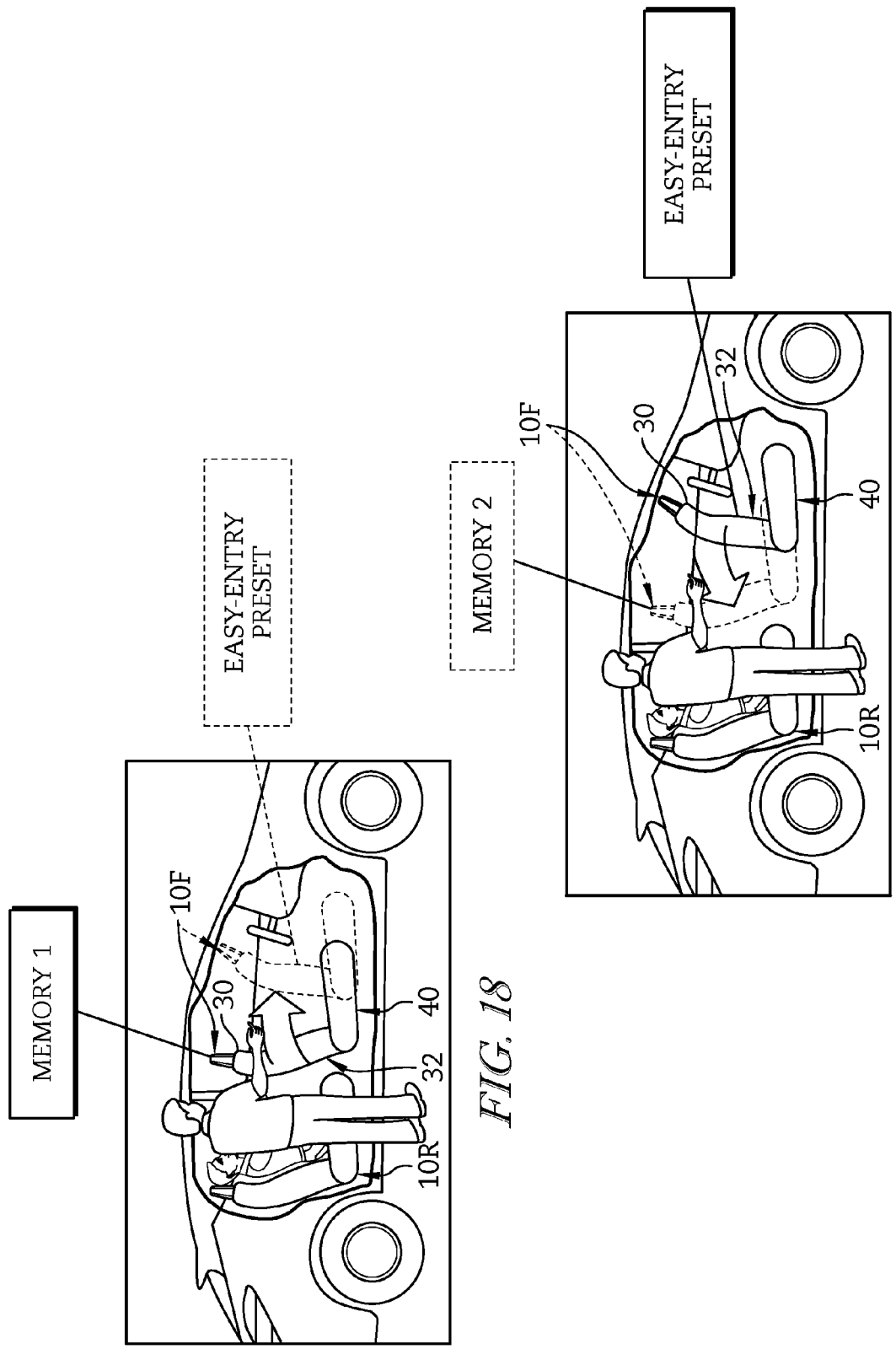

VEHICLE SEAT

CROSS REFERENCE TO RELATED APPLICATIONS

This application is a U.S. national stage application of international application No. PCT/US2015/023294 filed Mar. 30, 2015, which claims priority to U.S. Provisional Application Ser. No. 61/970,678, filed Mar. 26, 2014, The entire disclosures of PCT/US2015/023294 and U.S. Ser. No. 61/970,678 are hereby incorporated by reference.

BACKGROUND

The present disclosure relates to a vehicle seat, and particularly to a vehicle seat which may be moved relative to a floor of a vehicle. More particularly, the present disclosure relates to a vehicle seat including electronic components.

SUMMARY

According to the present disclosure, a vehicle seat includes a seat bottom and a seat back coupled to the seat bottom to extend upwardly away from the seat bottom. The vehicle seat further includes a seat-bottom foundation arranged to interconnect the seat bottom and seat back to translate back and forth relative to a vehicle floor.

In illustrative embodiments, the vehicle seat further includes a manual-memory system. The manual-memory system is configured to provide means for infinitely adjusting a longitudinal position of the vehicle seat relative to a floor included in a vehicle without the use of powered motors and locking the vehicle seat in a stored position as the vehicle seat moves into the stored position.

In illustrative embodiments, the vehicle seat further includes a smart-height system. The smart-height system is configured to provide means for moving the vehicle seat to a predetermined vertical position relative to the floor of the floor based on the longitudinal position of the vehicle seat relative to the floor of the vehicle so that comfort and safety of a passenger sitting on the vehicle seat are maximized.

In illustrative embodiments, the vehicle seat further includes an easy-entry system. The easy-entry system is configured to provide means for moving the vehicle seat between a predetermined entry arrangement which maximizes space formed between a rear seat and the vehicle seat so that ease of entry into the rear seat is maximized and one of a previously stored arrangement.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1A is a perspective and diagrammatic view of a vehicle seat in accordance with the present disclosure showing that the vehicle seat includes a manual memory system configured to provide infinite adjustment of a longitudinal position of the vehicle seat relative to a vehicle floor and storage of those longitudinal positions for recall at a later time and an easy-entry system configured to move the vehicle seat between a predetermined entry arrangement and one of the previously stored positions;

Figure 3:
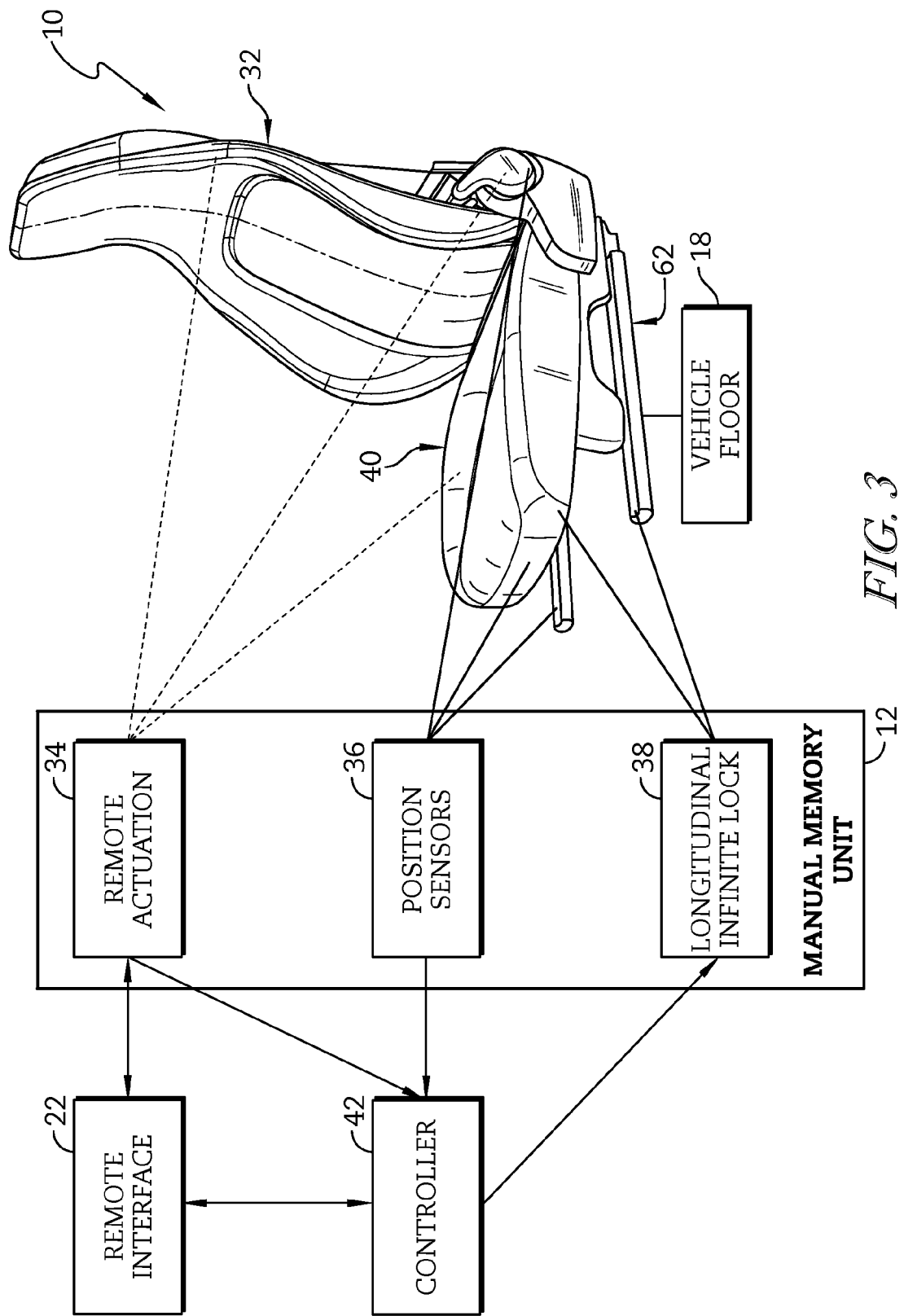
Figure 4:
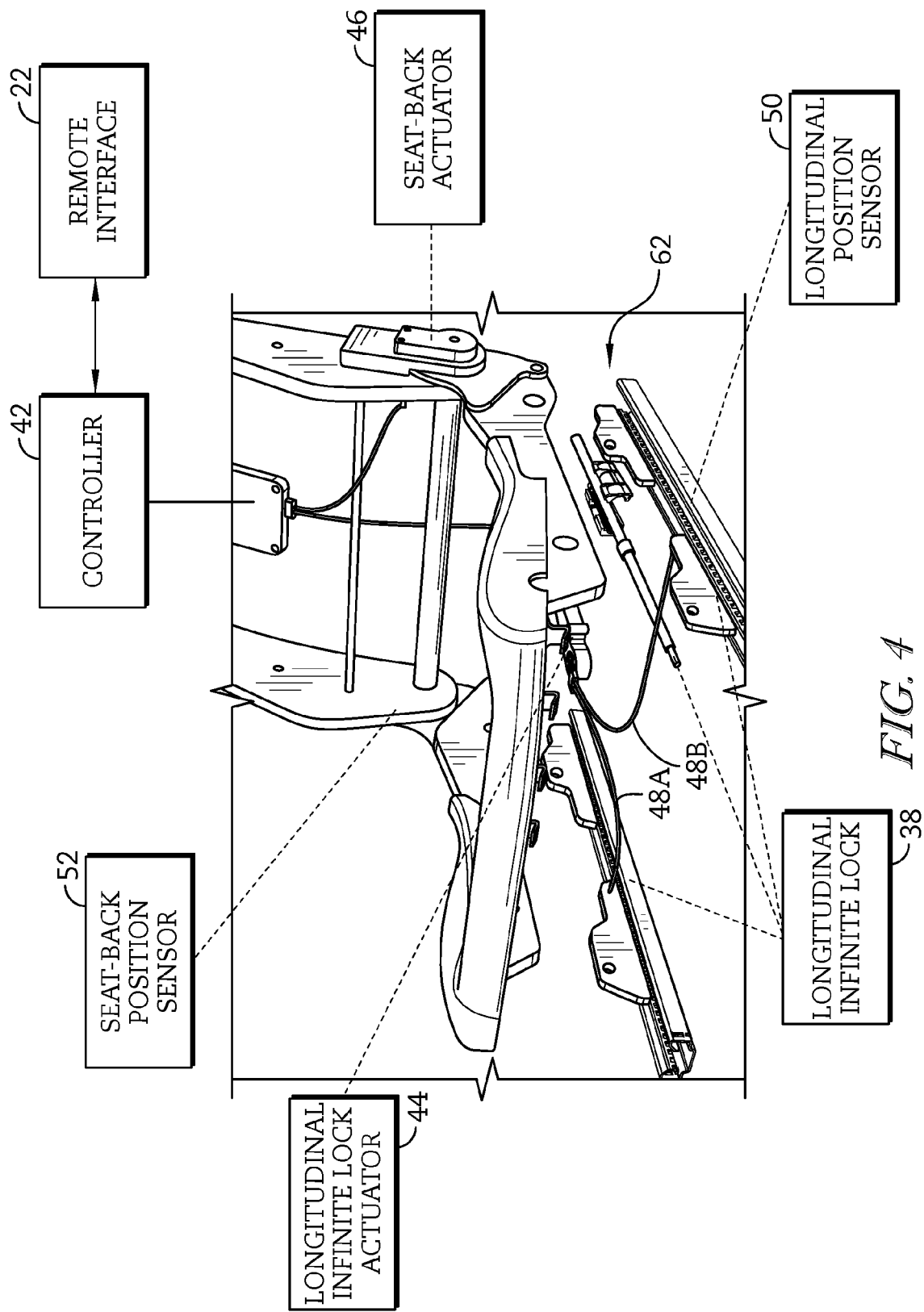
Figure 5:
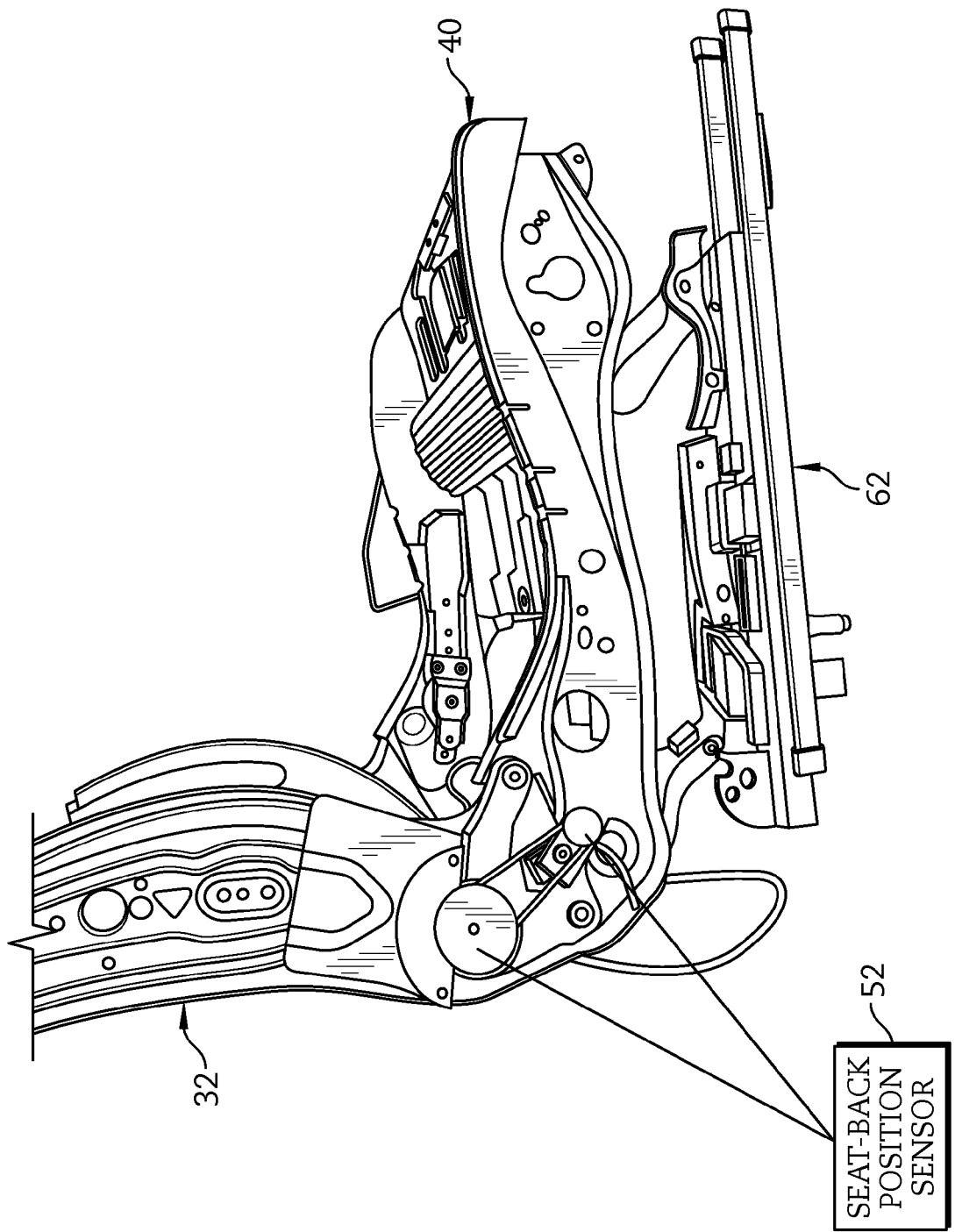
Figure 6:
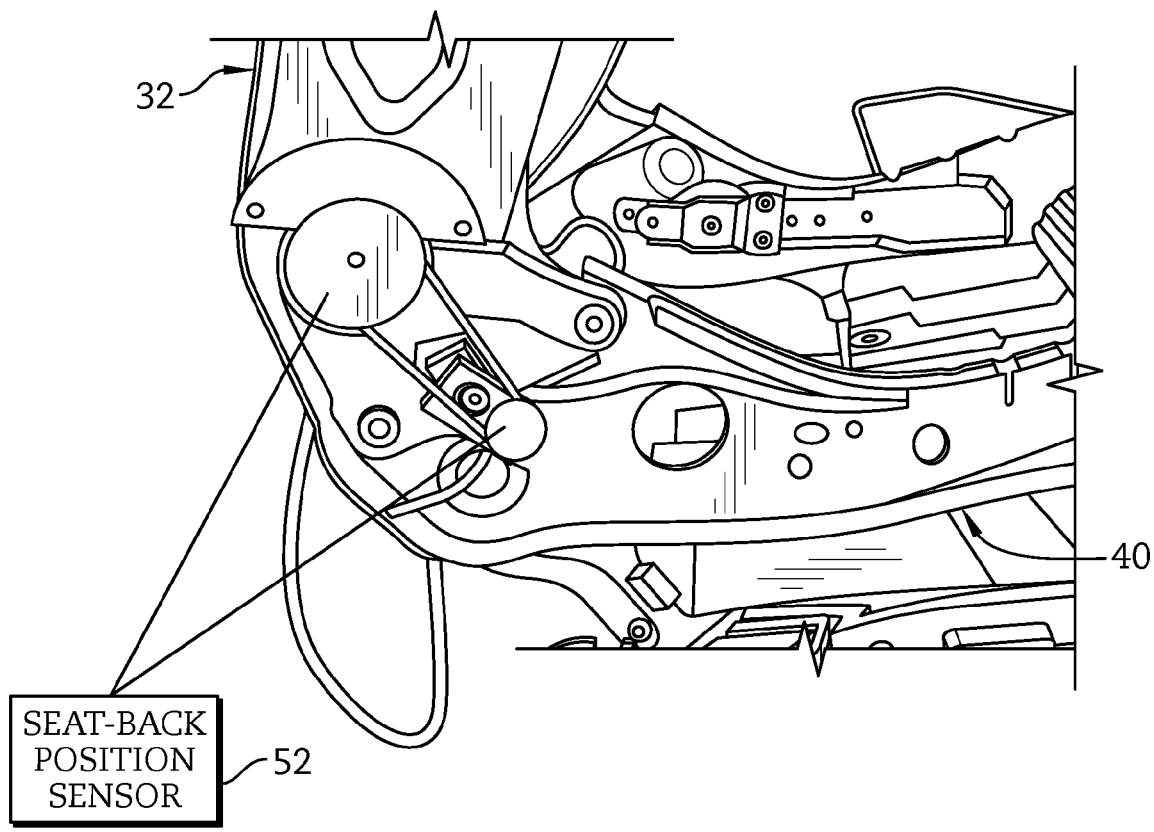
Figure 7:
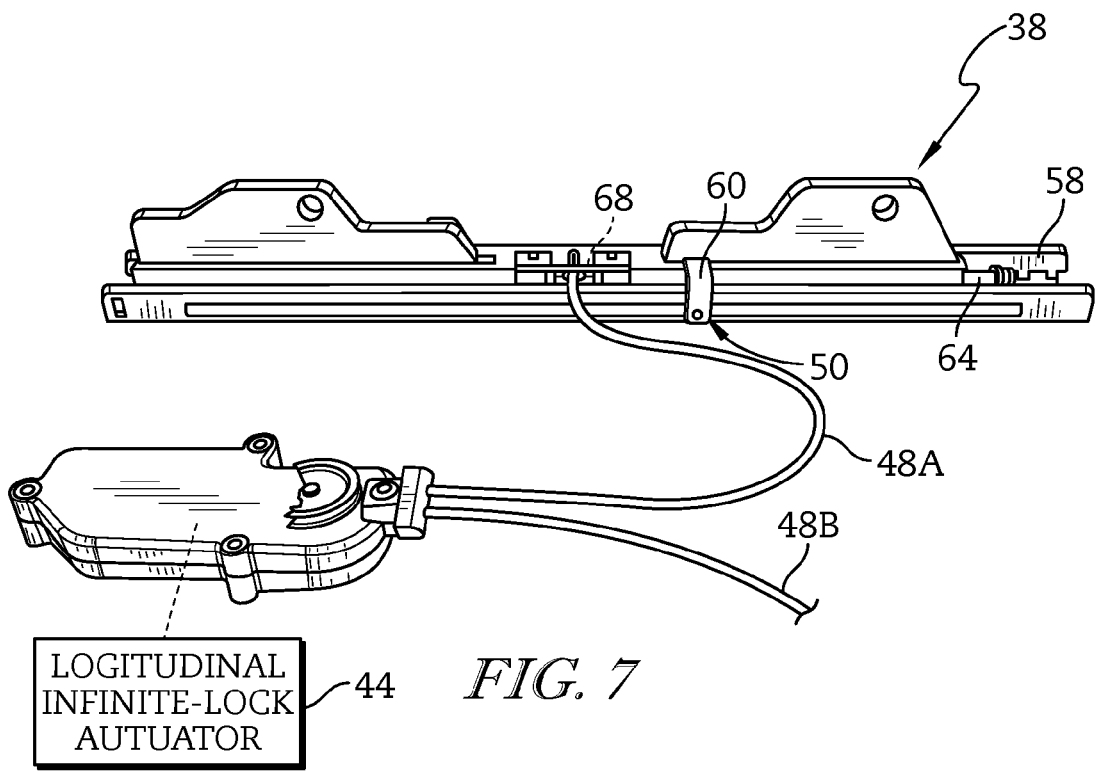
Figure 8:
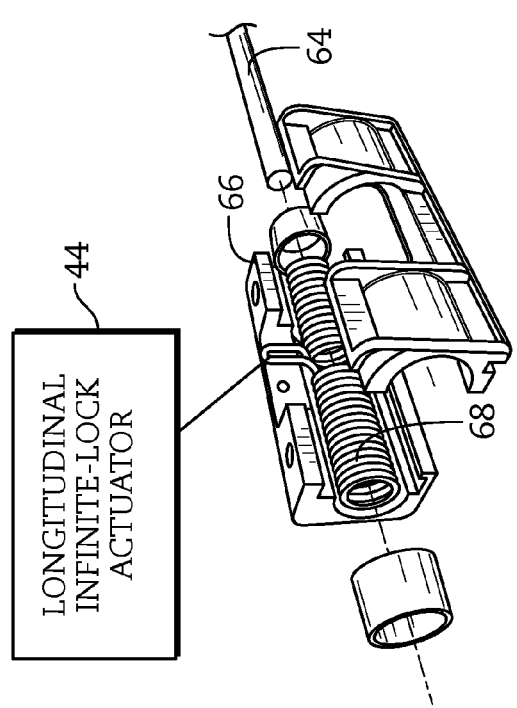
Figure 9:
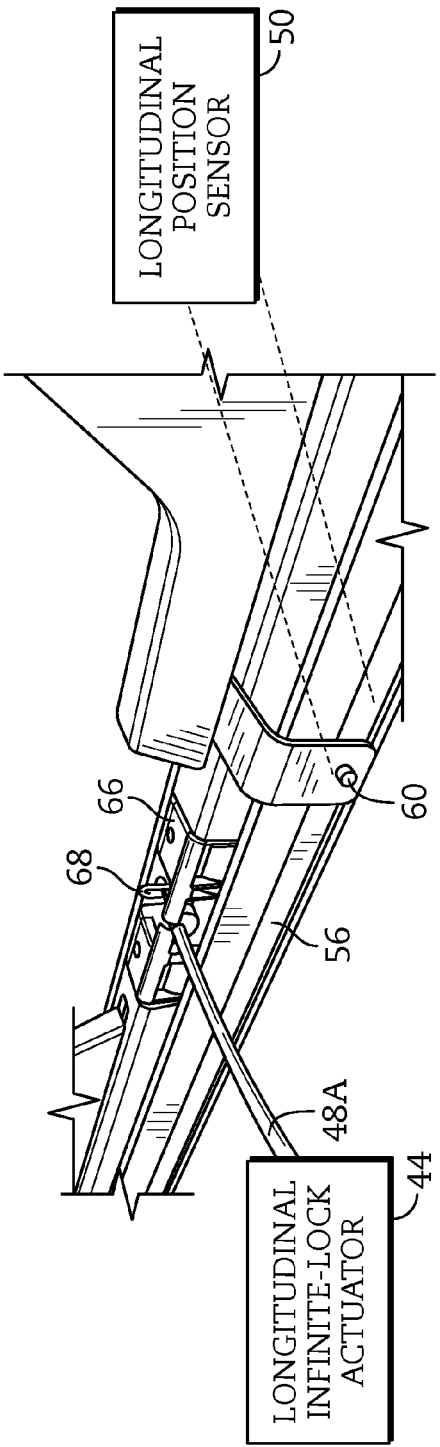
Figure 10:
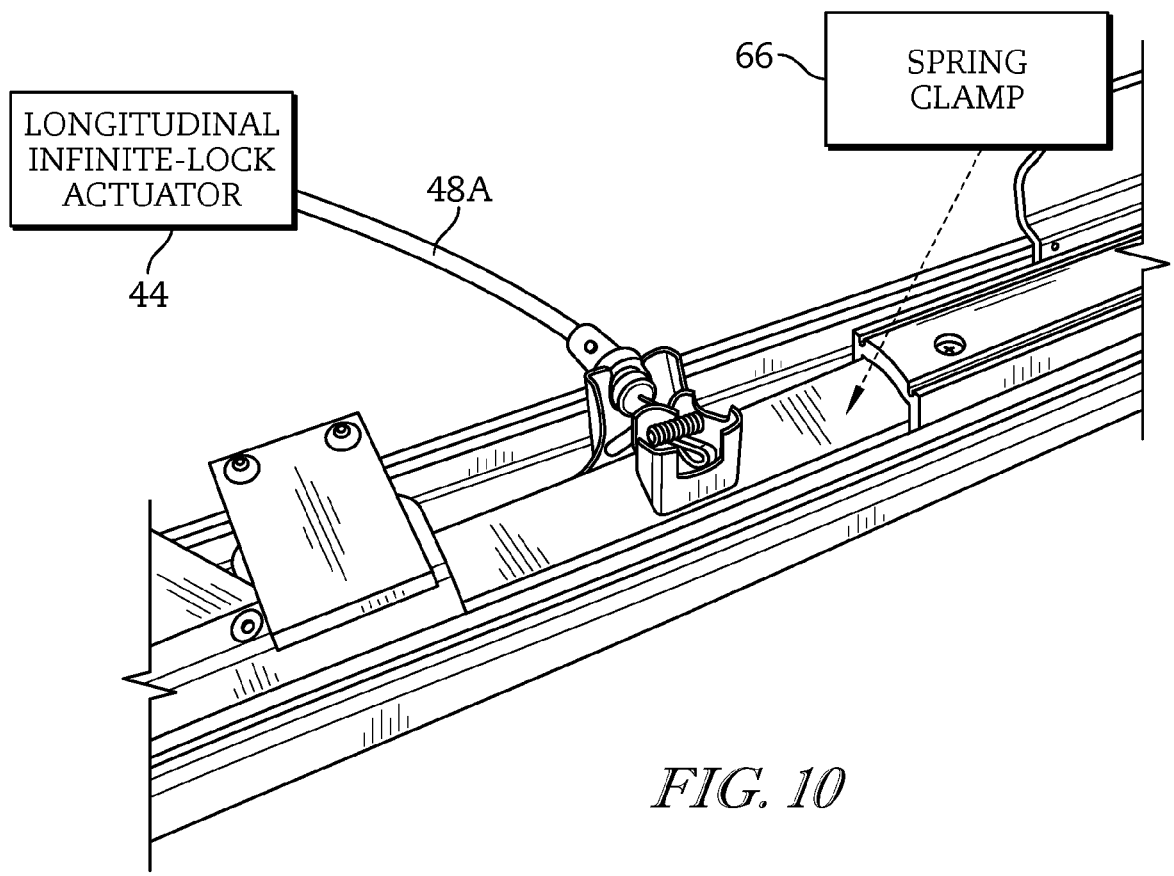
Figure 11:
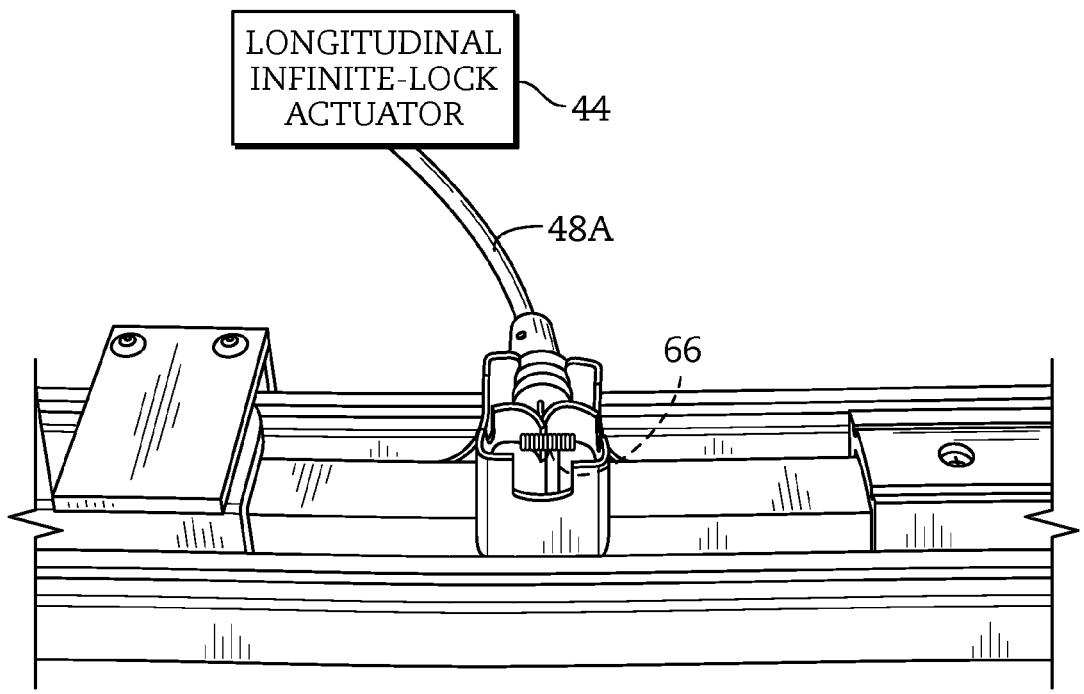
Figure 12:
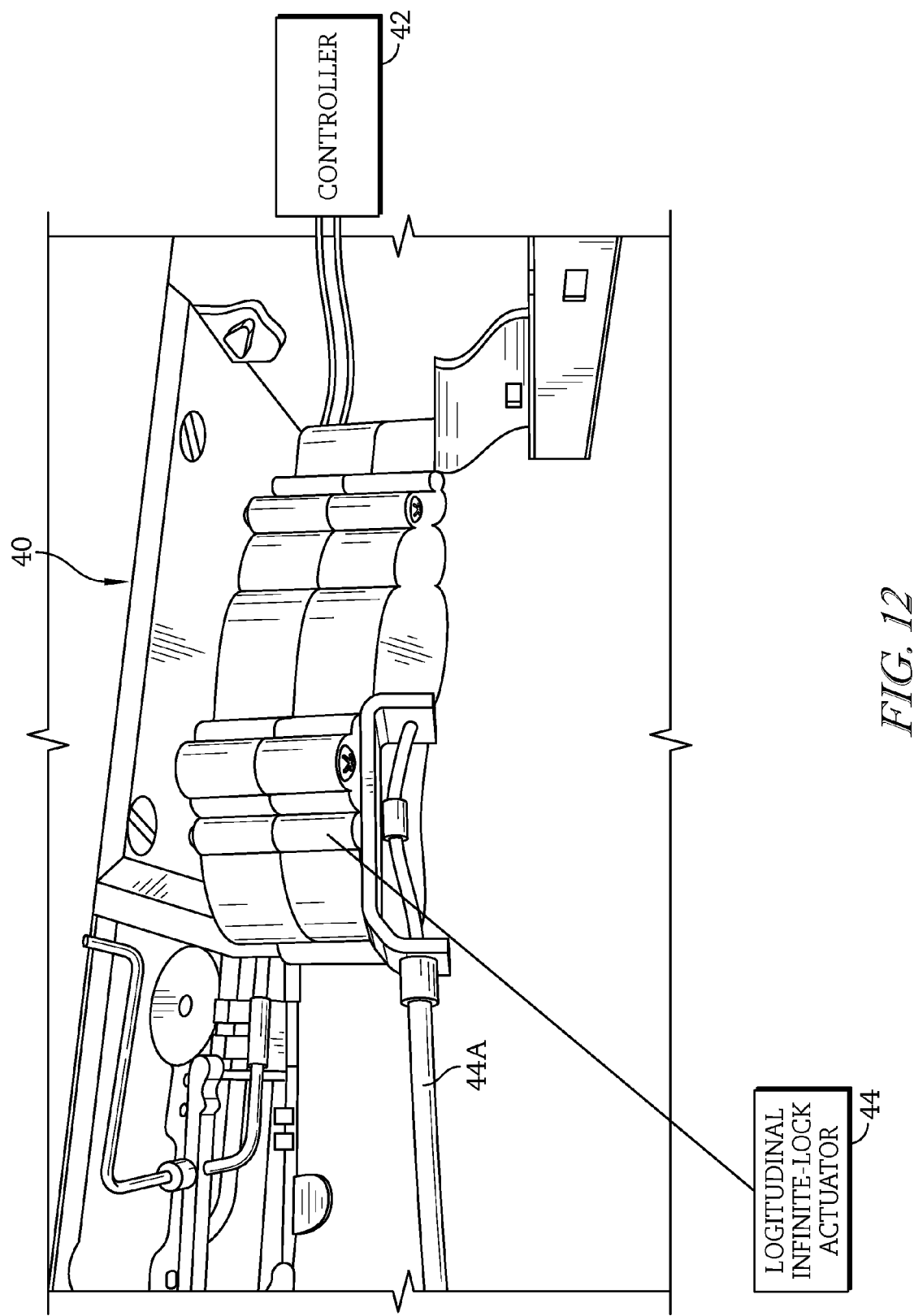
Figure 13:
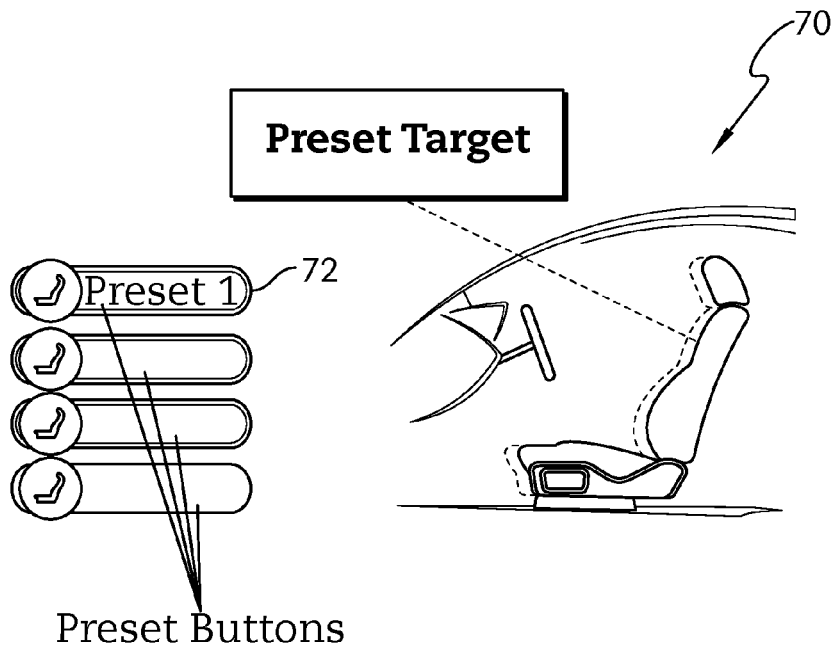
Figure 14:
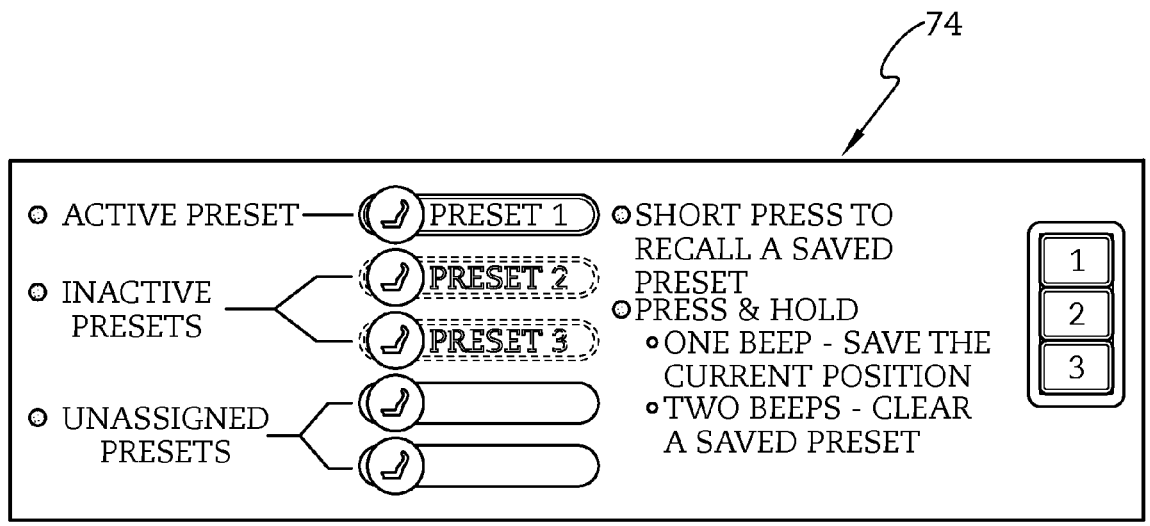
Figure 15:
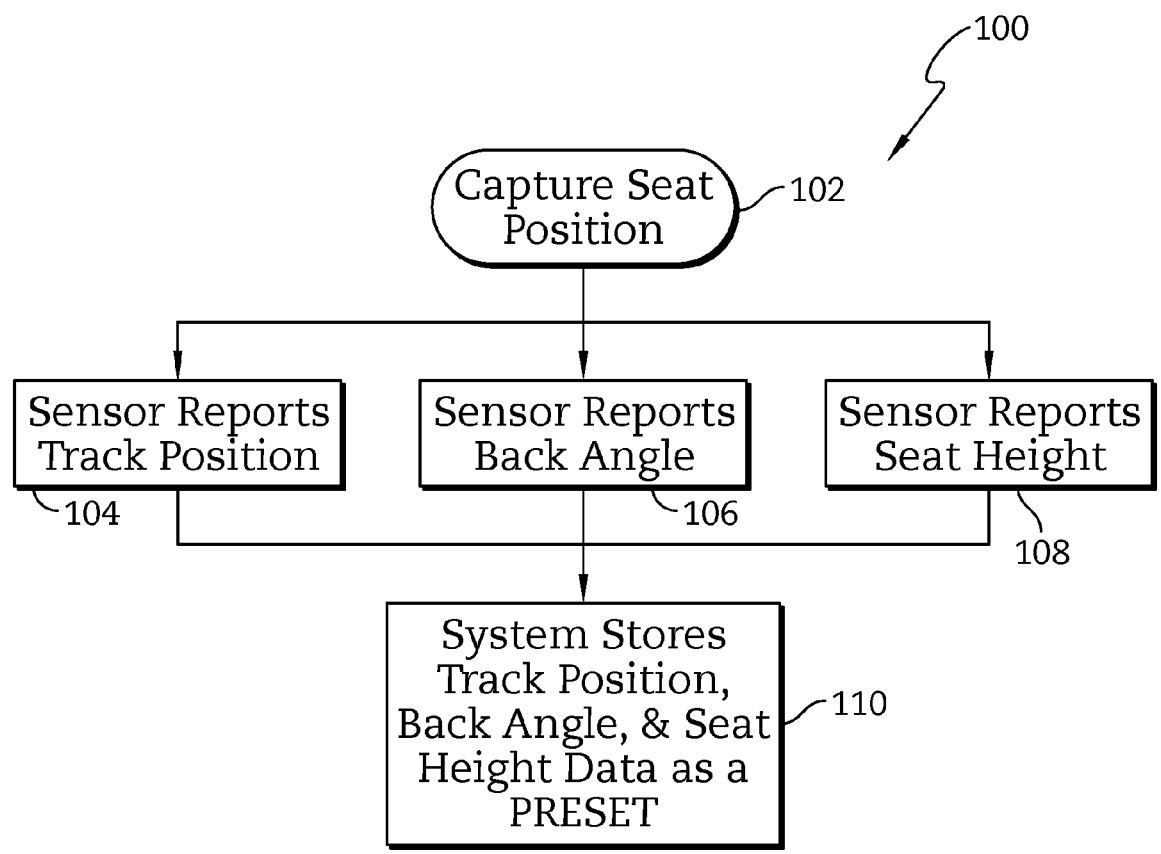
Figure 16:
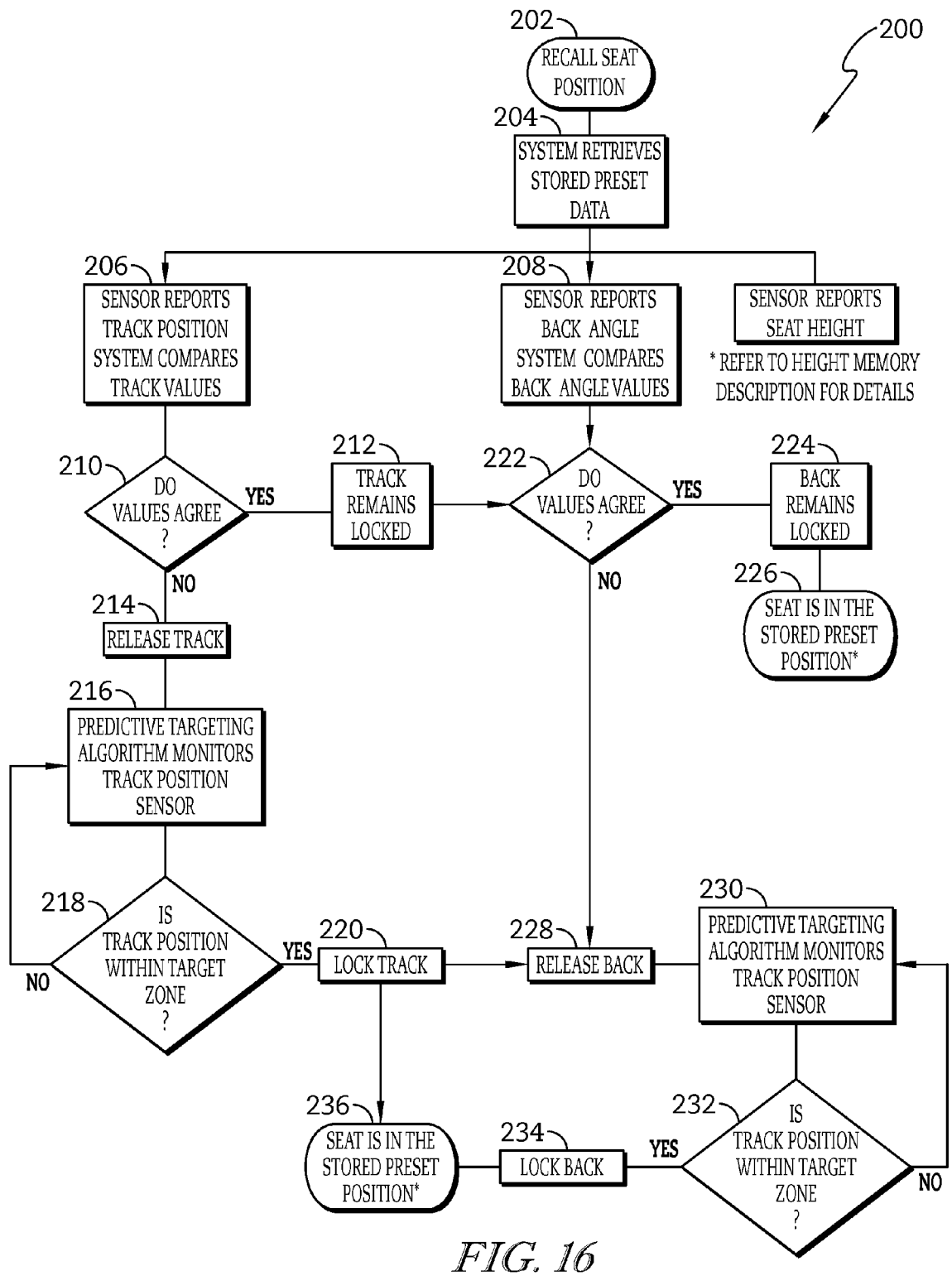
Figure 17:
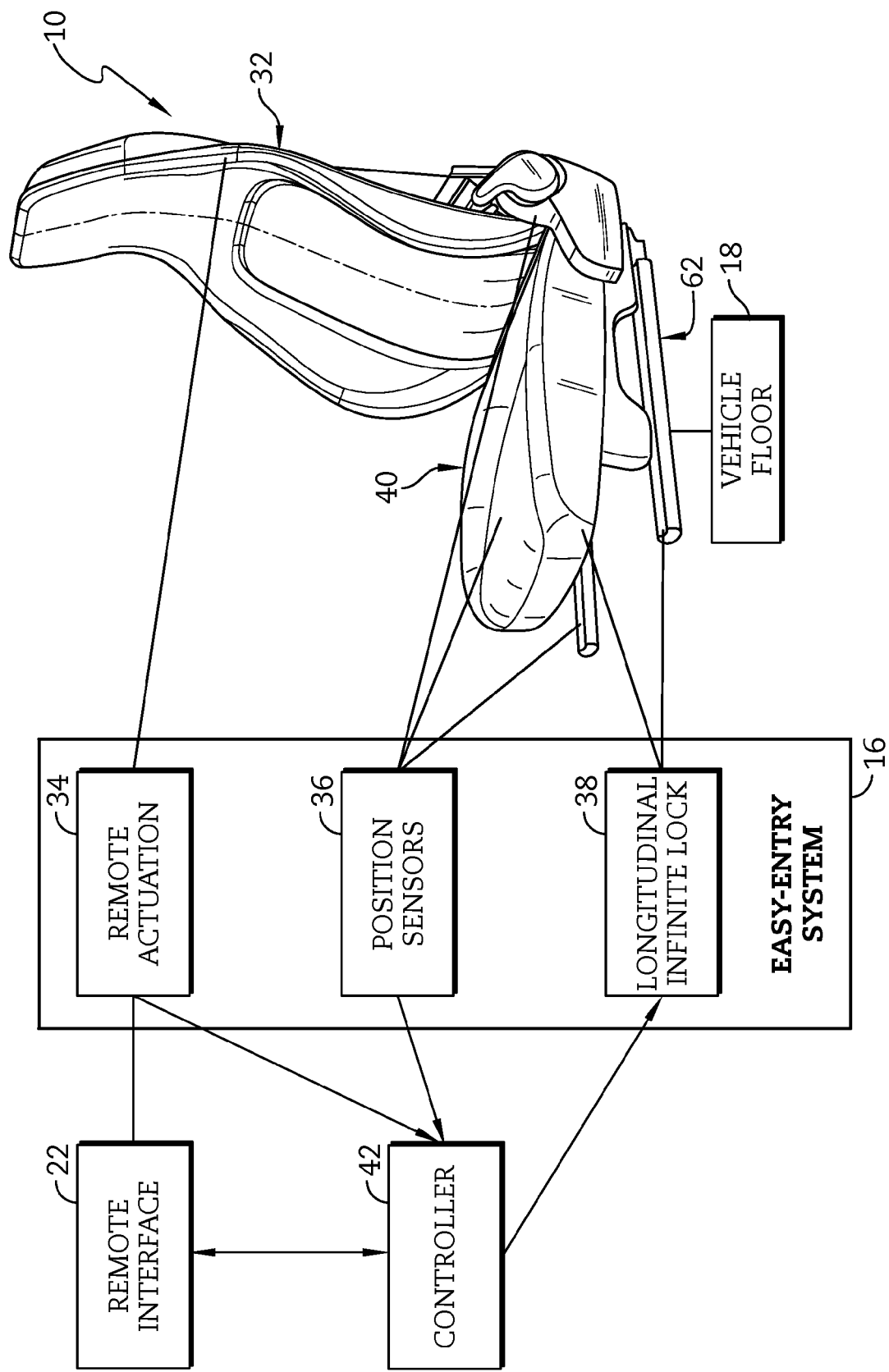
Figure 20:
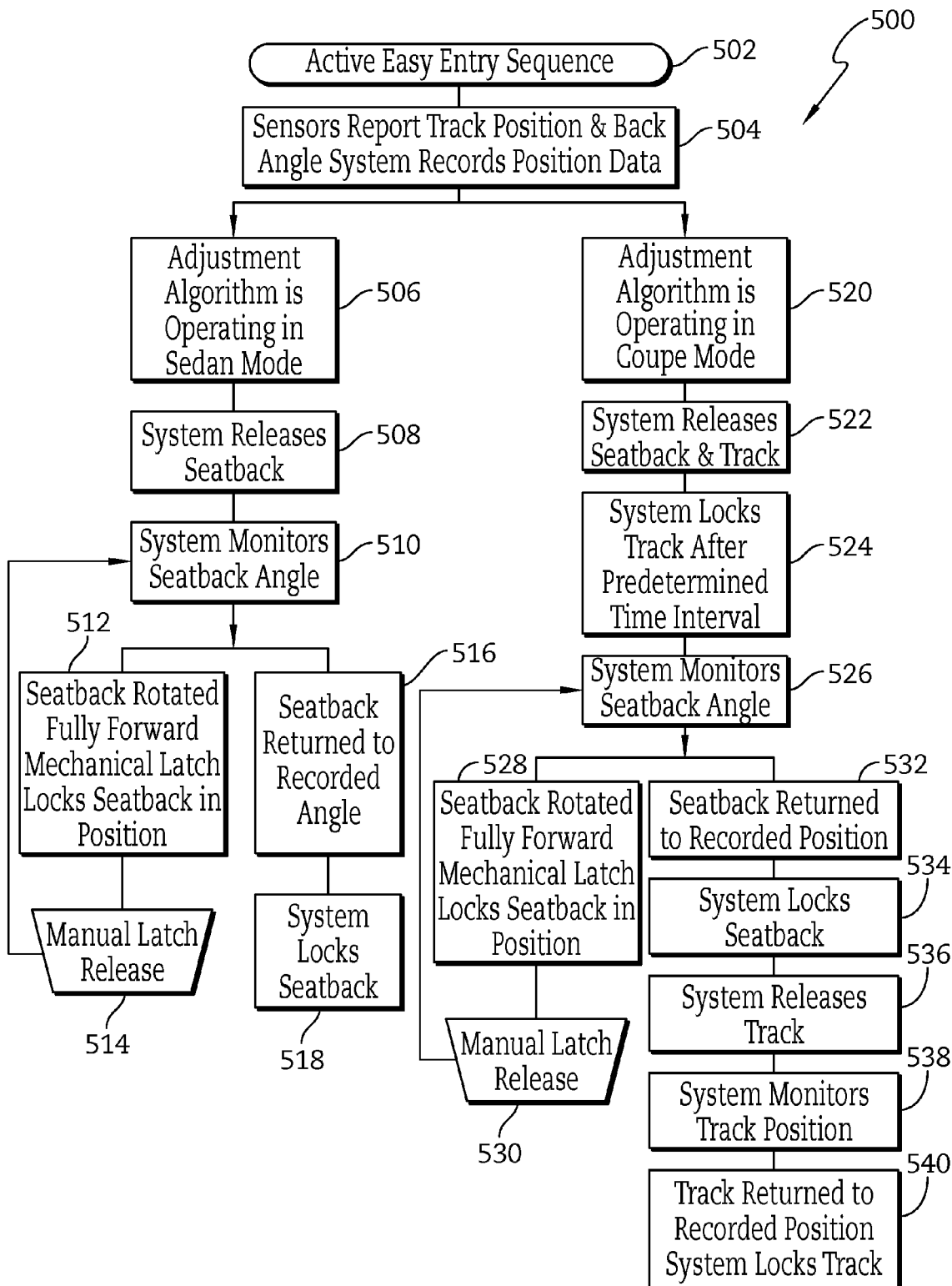
Figure 21:
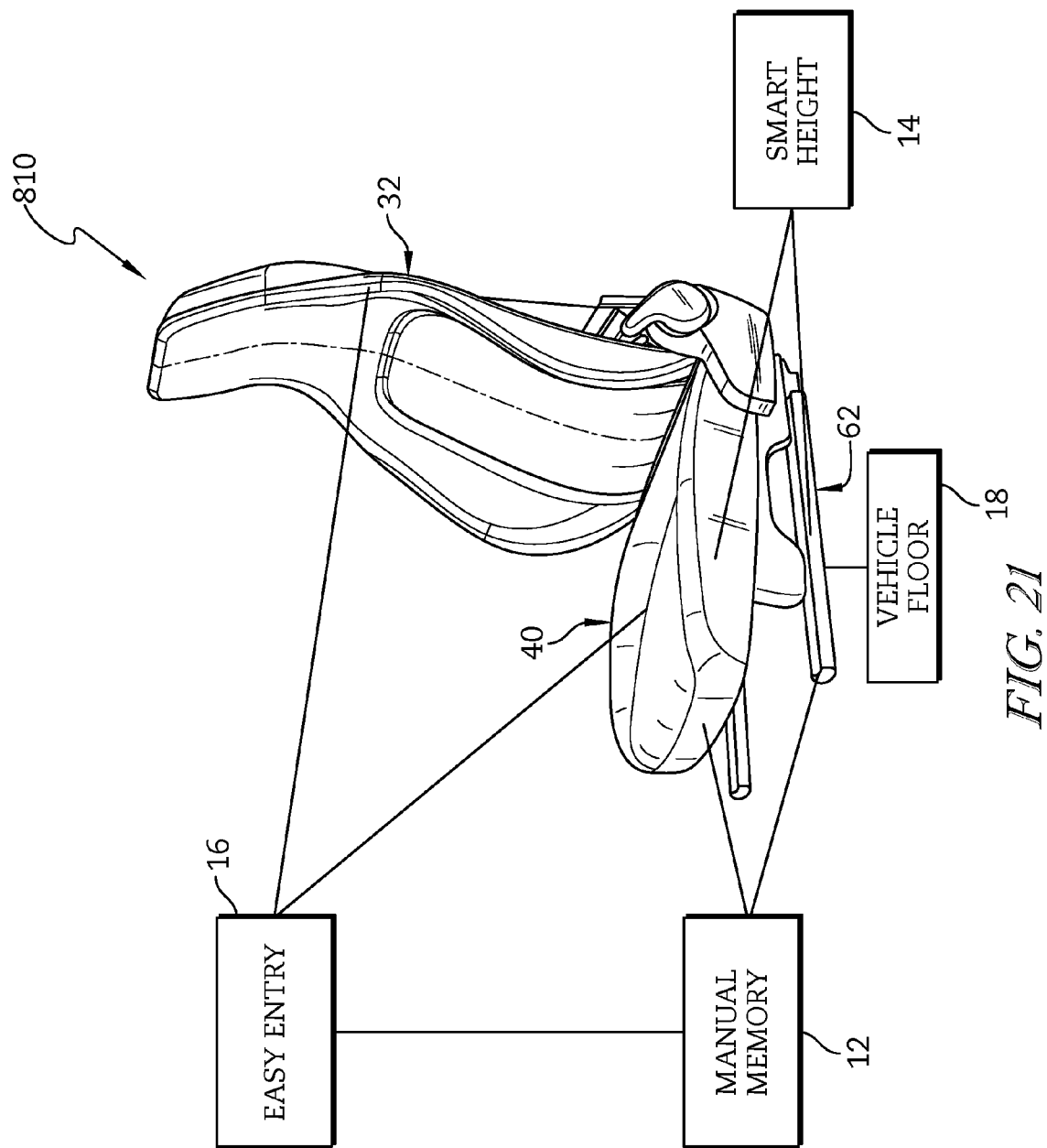
Figure 22:
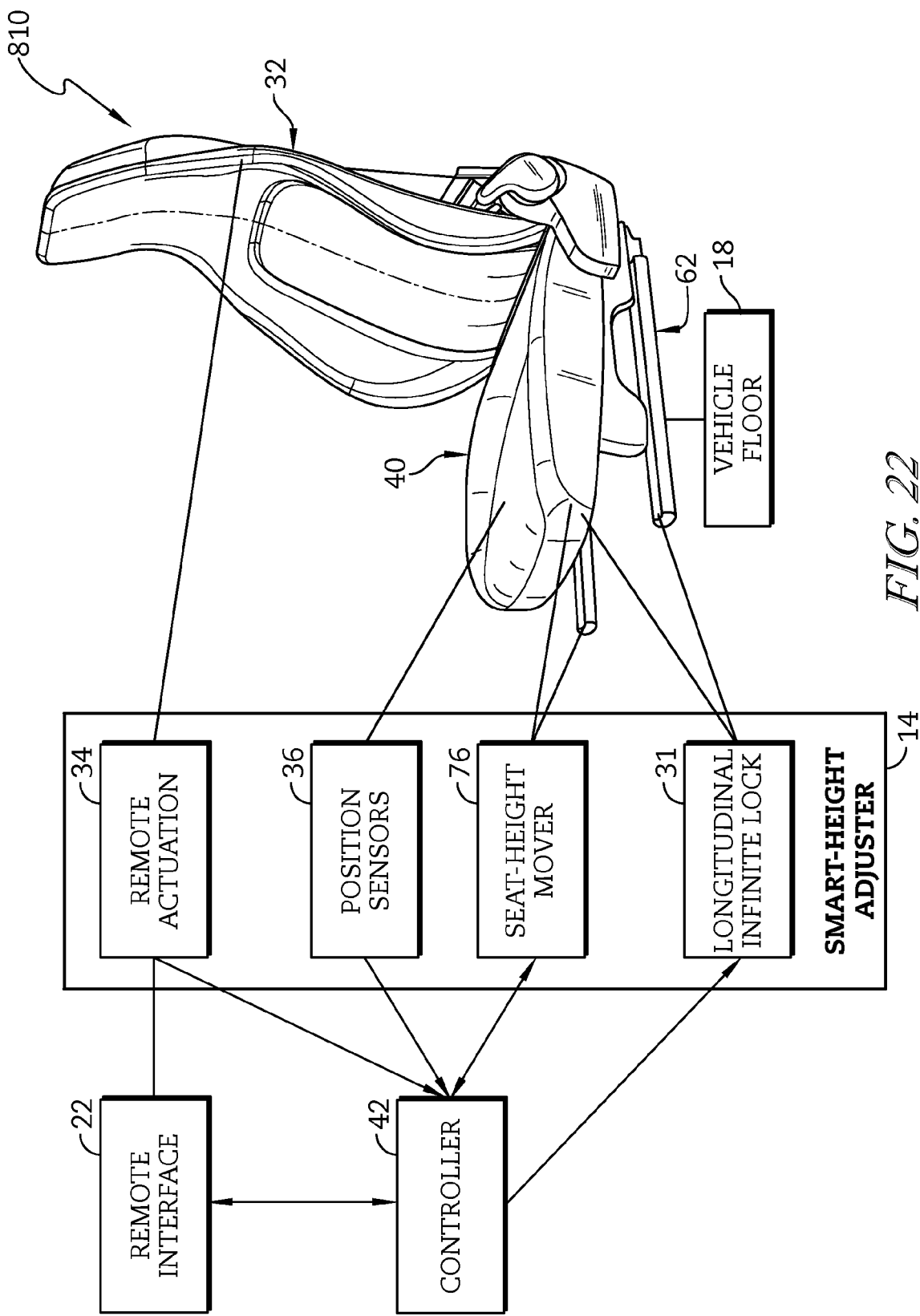
Figure 23:
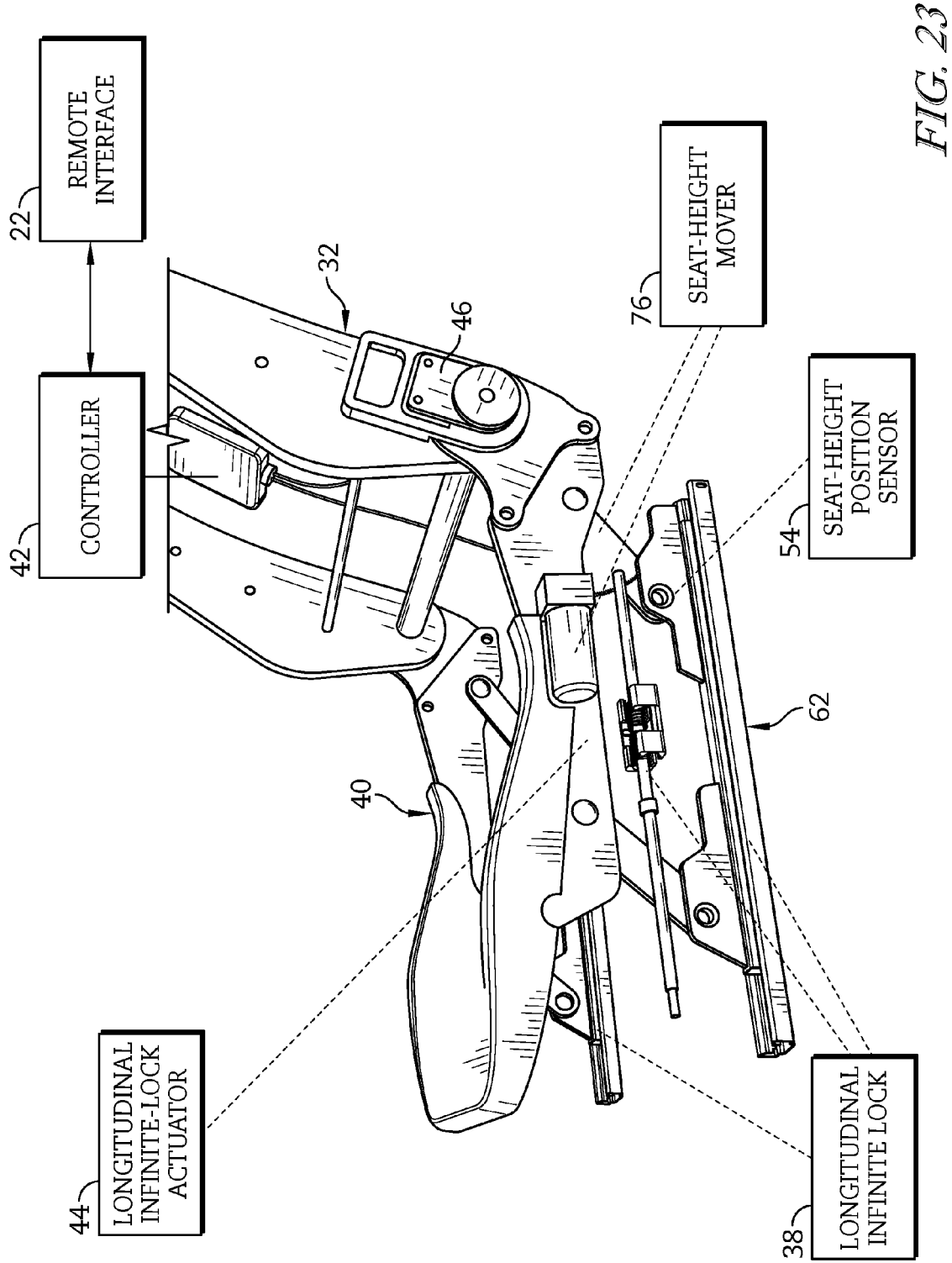
Figure 24:
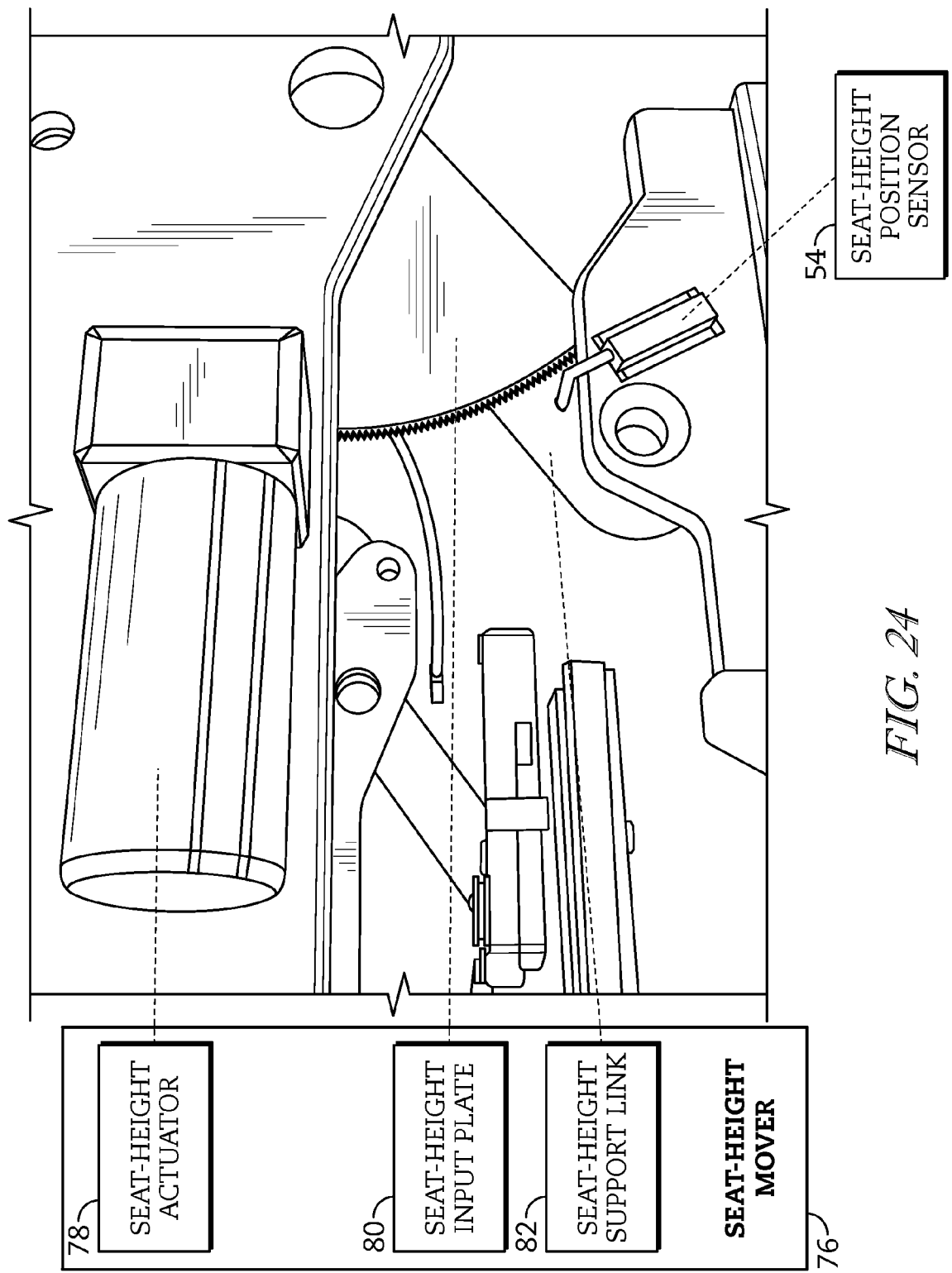
Figure 25:
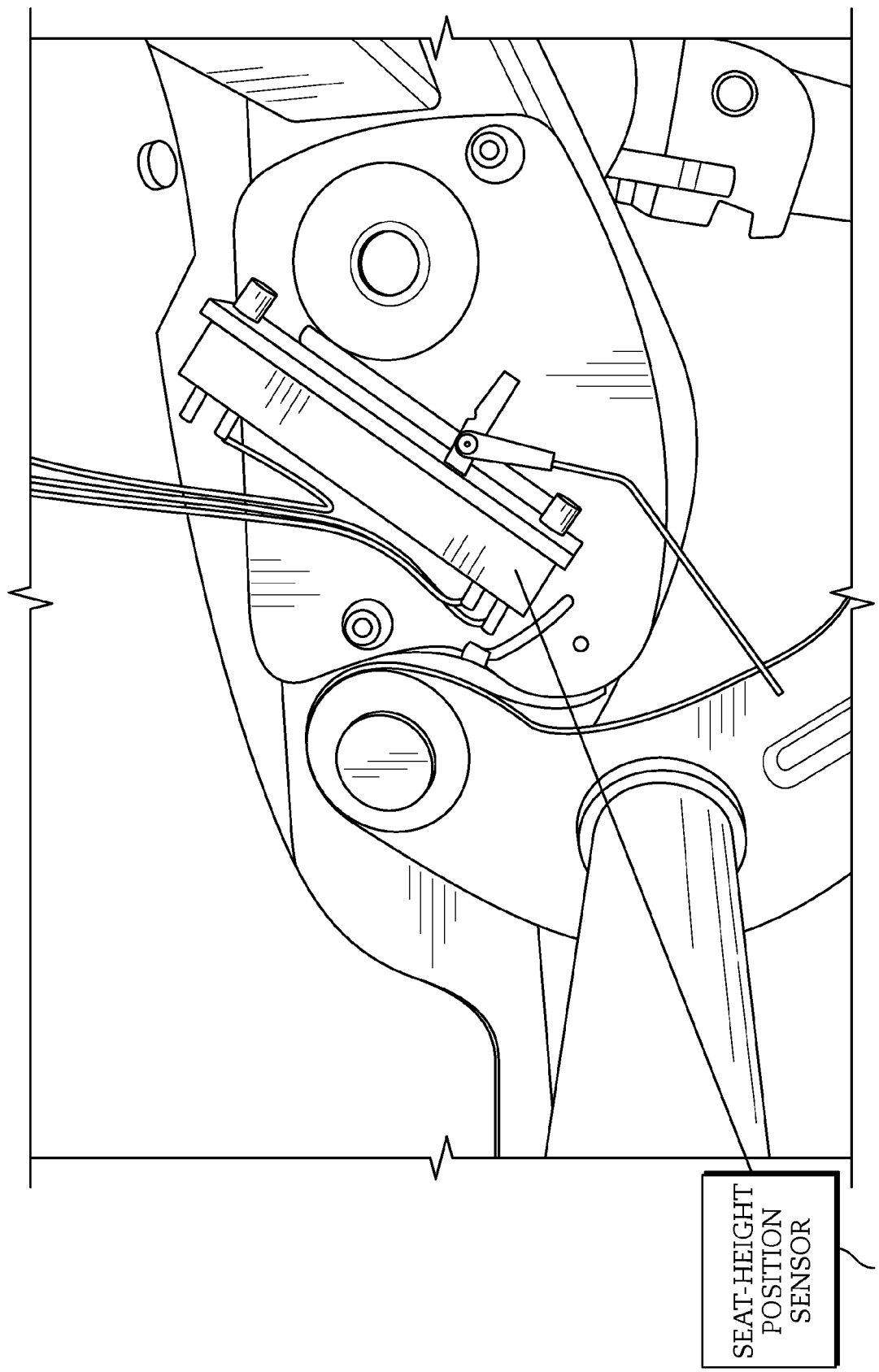
Figure 26:
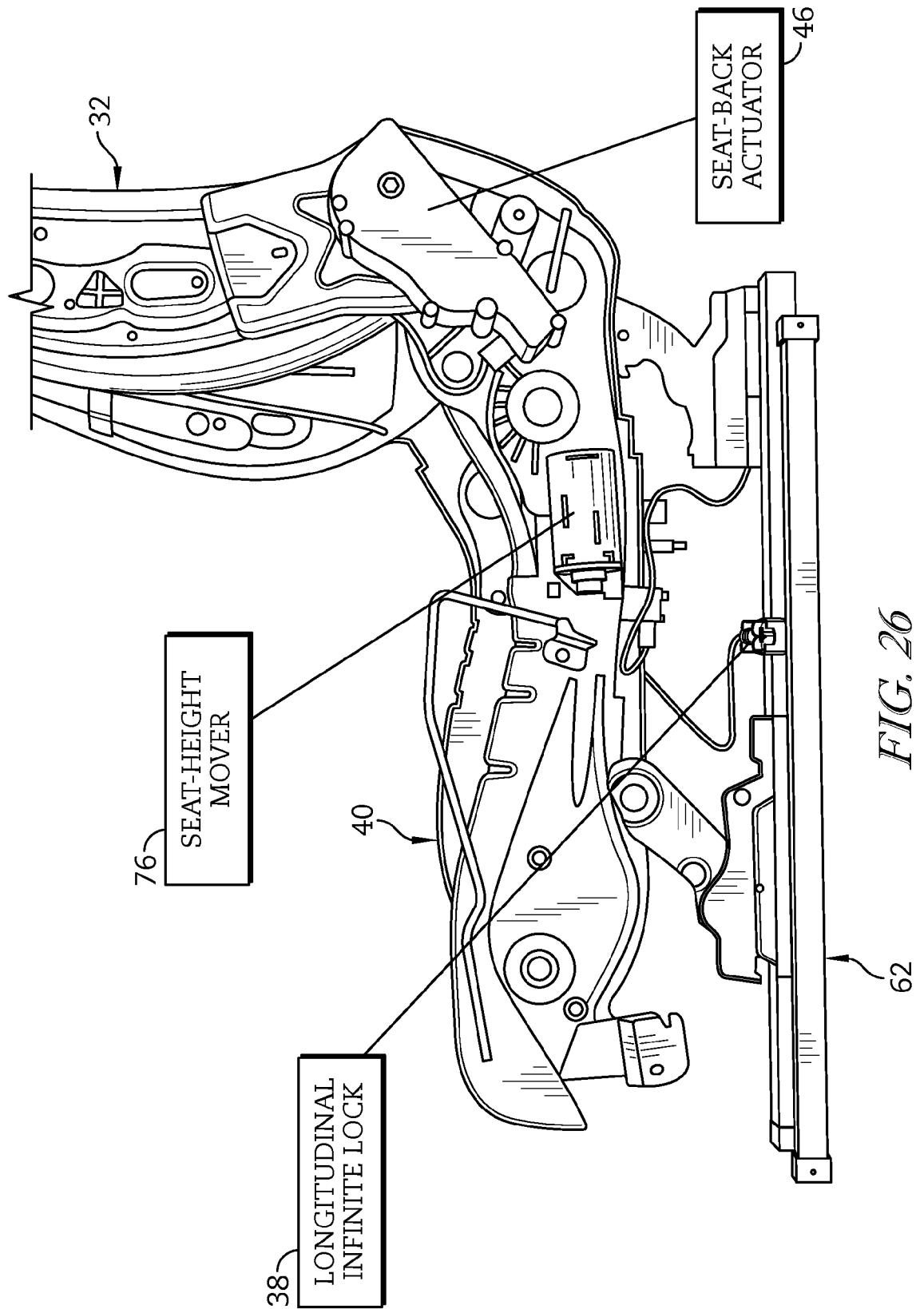
Figure 27:
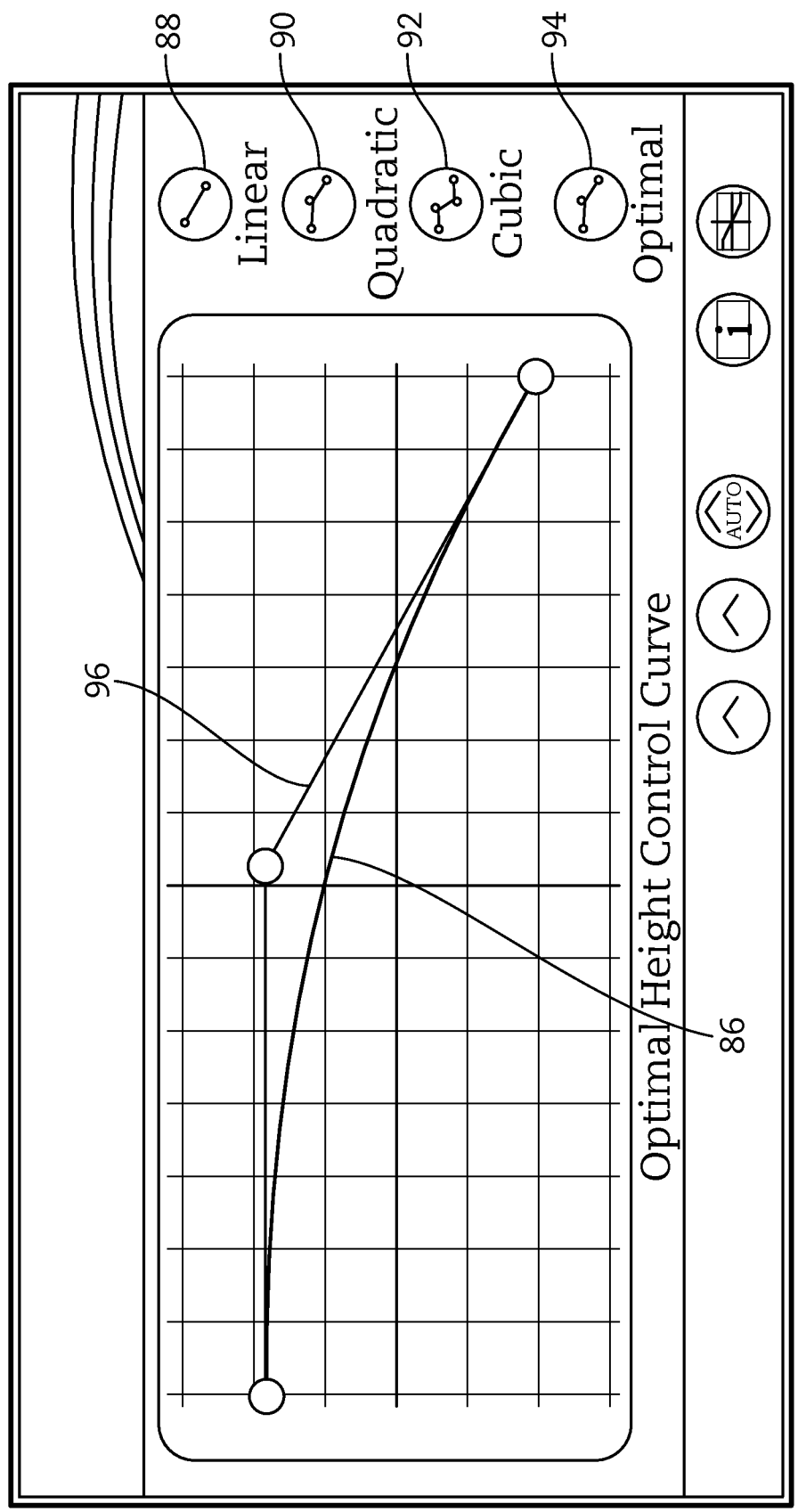
Figure 28:
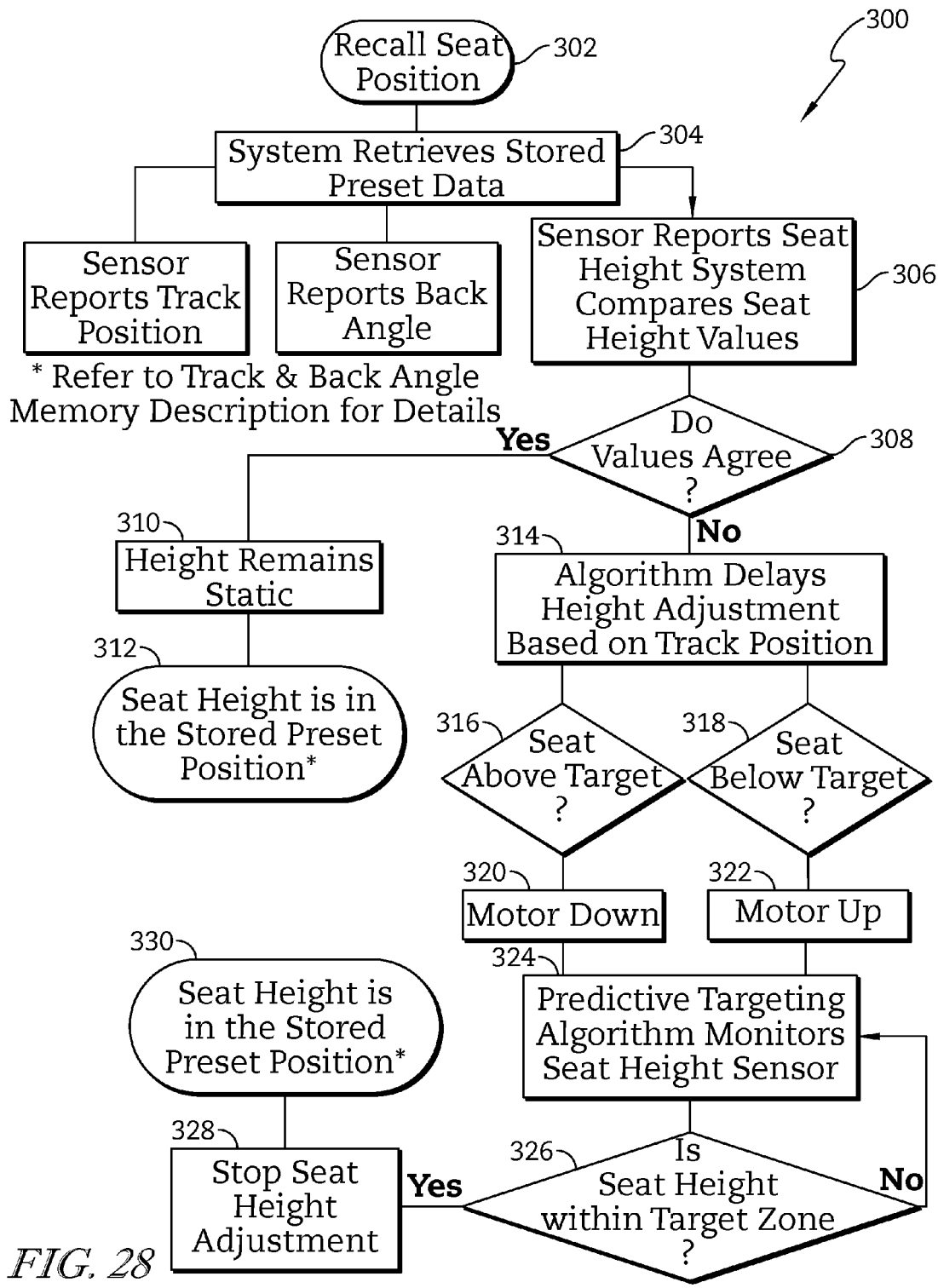
Figure 29:
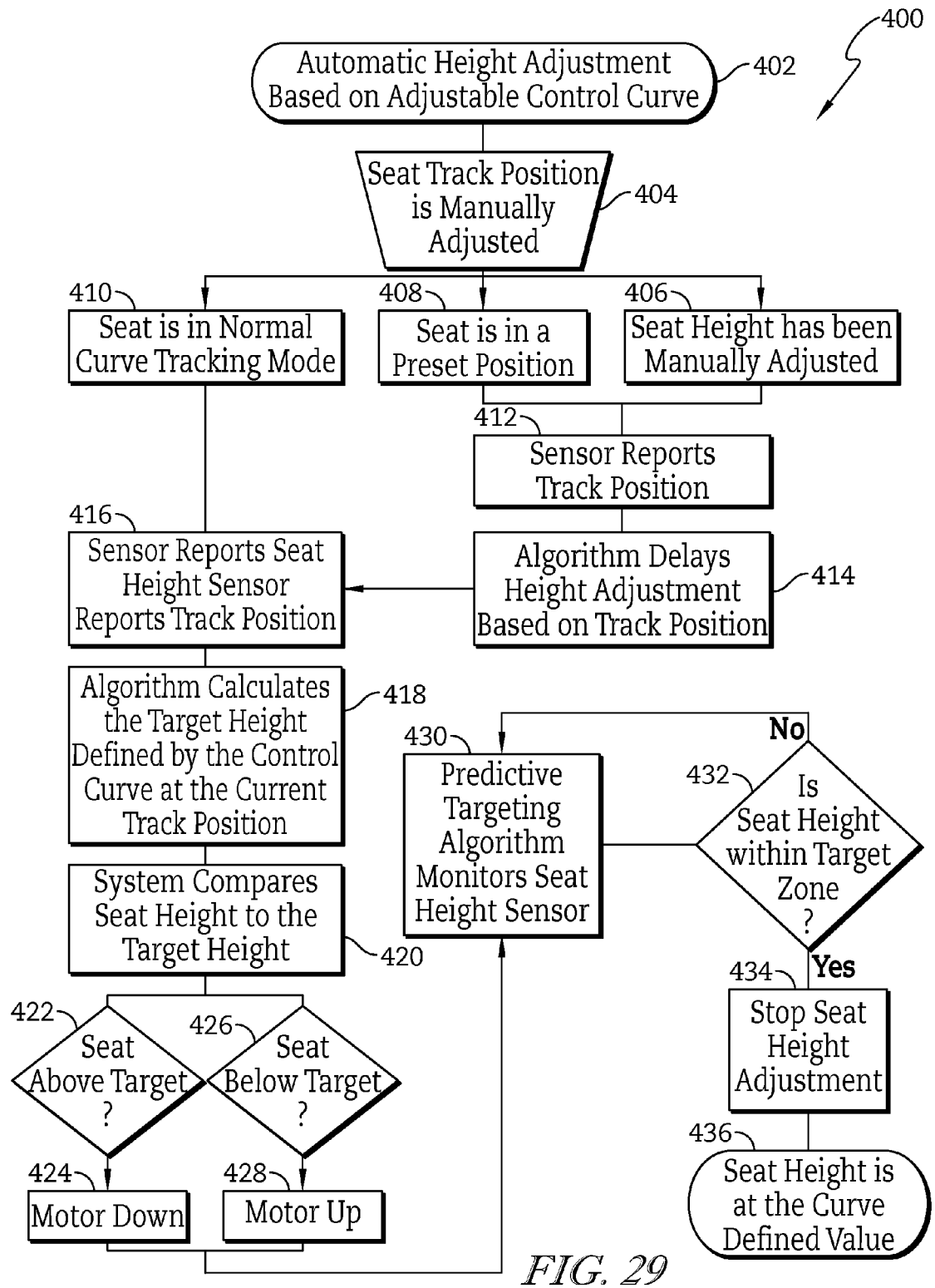
Figure 30:
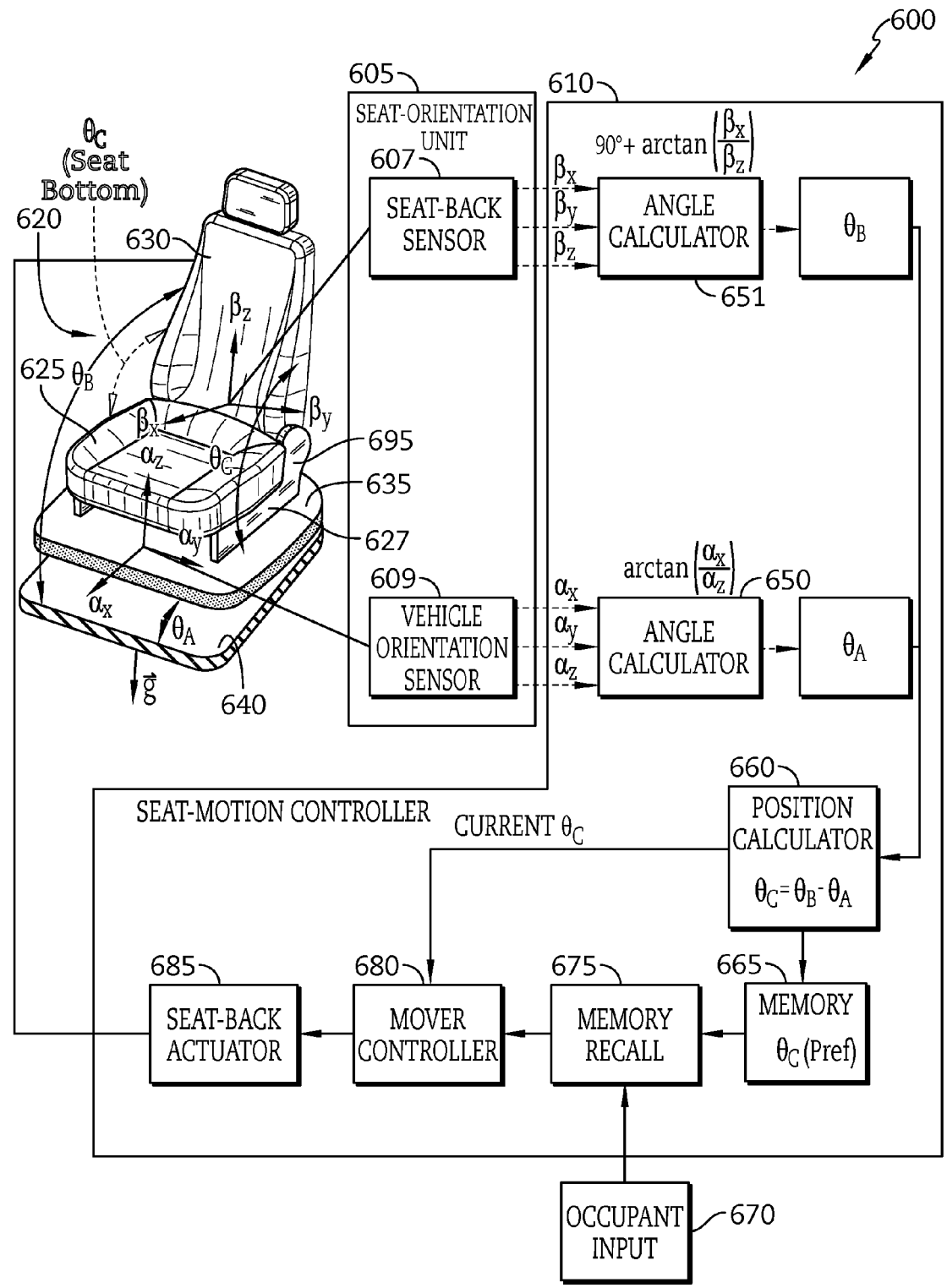

FIG. 3 is a perspective and diagrammatic view of the vehicle seat of FIG. 1 showing that the manual-memory system includes a remote-actuation unit configured to provide remote actuation of actuators included in the various systems of the vehicle seat, a position-sensor unit configured to sense a longitudinal position of the vehicles seat, a vertical position of the vehicle seat, and an angular position of the a seat back included in the vehicle seat, and a longitudinal infinite lock unit configured to selectively block movement of the vehicle seat relative to the vehicle floor along a longitudinal path at any position along the path;

FIG. 4 is a partial exploded assembly view and diagrammatic view of the vehicle seat of FIG. 3 showing that the manual-memory system includes, from top to bottom, a controller, a seat back-position sensor, a seat-back actuator, a longitudinal infinite-lock actuator, a longitudinal position sensor, and a longitudinal infinite lock;

FIG. 5 is a partial elevation view a vehicle seat in accordance with the present disclosure showing one embodiment of a seat-back position sensor coupled to both a seat back and a seat bottom included in the vehicle seat;

FIG. 6 is an enlarged portion of FIG. 5 showing the seat-back position sensor;

FIG. 7 is a partial perspective and diagrammatic view of a portion of the longitudinal infinite lock unit coupled to a slide mechanism included in a seat-bottom foundation of the vehicle seat and a longitudinal infinite-lock actuator coupled to a spring clamp included in the longitudinal infinite lock unit;

FIG. 8 is an exploded assembly view of the spring clamp of FIG. 7 showing that the spring clamp includes a guide rod coupled to the slide mechanism in a fixed position, a seat-bottom mount coupled to the guide rod to slide back and forth along the guide rod, and a torsion spring coupled to the guide rod to move between an engaged position in which a first friction force engages the guide rod to block movement of the seat-bottom mount and seat-bottom relative to the floor and a disengaged position in which a relatively smaller second force engages the guide rod and allows movement of the seat-bottom relative to the floor;

FIG. 9 is a partial perspective and diagrammatic view of a portion of a longitudinal position sensor in accordance with the present disclosure showing that the longitudinal position sensor includes a potentiometer strip coupled in a fixed position to a stationary portion of the slide mechanism and a deflector coupled to a moving portion of the slide mechanism and configured to engage a portion of the potentiometer strip so that an absolute location of the vehicle seat along the longitudinal path is known;

FIG. 10 is a diagrammatic view showing a portion of the longitudinal infinite lock unit included in a vehicle seat;

FIG. 11 is a diagrammatic view taken from another perspective showing the portion of the longitudinal infinite lock unit of FIG. 10;

FIG. 12 is a diagrammatic view of a longitudinal infinite-lock actuator coupled to an underside of a seat bottom included in the vehicle seat of FIGS. 10 and 11;

FIG. 13 is a diagrammatic view of a display screen shown on the interactive display during use of the vehicle seat indicating that one or more positions of the vehicle seat may be stored in memory of the controller;

FIG. 14 is a diagrammatic view of another display screen shown on the interactive display during use of the vehicle seat indicating how to recall a saved position, how to store a position in memory, and how to clear a position from memory;

FIG. 15 is a diagrammatic view showing a portion of a process in which an arrangement of the vehicle seat is stored in memory;

FIG. 16 is a diagrammatic view showing a portion of a process in which the stored arrangement is recalled and the vehicles seat moves to the stored arrangement in response to application of the user-applied force to the vehicle seat;

FIG. 17 is a perspective and diagrammatic view of the vehicle seat of FIG. 1 showing that the easy-entry system includes the remote-actuation unit, the position-sensor unit, and the longitudinal infinite lock unit;

FIG. 18 is a diagrammatic view showing how a user engages the remote-actuation unit to cause the vehicle seat to move to a predetermined entry arrangement in which the vehicle seat moves to a forward most position along the longitudinal path and the seat back moves to a forward most position relative to the seat bottom;

FIG. 19 is a view similar to FIG. 26 showing how the user engages the remote-actuation unit to cause the vehicle seat to return to the previous arrangement (Memory 1) after the passenger has entered the vehicle;

FIG. 20 is a diagrammatic view of a portion of process showing how the controller uses the various sensors and systems to move the vehicle seat to the entry arrangement;

FIG. 21 is a perspective and diagrammatic view of another embodiment of a vehicle seat in accordance with the present disclosure showing that the vehicle seat includes the manual memory system, the easy-entry system, and a smart-height system configured to move the vehicle seat up and down relative to the floor of the vehicle and provide a predetermined vertical position of the vehicle seat between a predetermined entry arrangement and one of the previously stored positions;

FIG. 22 is a perspective and diagrammatic view of the vehicle seat of FIG. 21 showing that the smart-height system includes the remote-actuation unit, the position-sensor unit, the longitudinal infinite lock unit, and a smart-height mover configured to provide the predetermined vertical position of the vehicle seat relative to the vehicle floor associated with each longitudinal location of the vehicle seat;

FIG. 23 is a partial exploded assembly view and diagrammatic view of the vehicle seat of FIGS. 21 and 22 showing that the smart-height system includes, from top to bottom, the controller, the longitudinal infinite-lock actuator, the longitudinal infinite lock, a seat-height mover, and a seat-height position sensor;

FIG. 24 is an enlarged partial perspective and diagrammatic view of the smart-height system of FIGS. 22 and 23 showing that the seat-height mover includes a seat-height actuator, a seat-height input plate, and a seat-height support link and that the seat-height position sensor is coupled to the seat-height support link to sense a position of the seat-height support link;

FIG. 25 is a diagrammatic view of the seat-height position sensor included in a smart-height system of FIG. 24 taken from another perspective;

FIG. 26 is a diagrammatic view of the vehicle seat of FIGS. 21 and 22 with portions broken away to reveal the seat-height mover, the longitudinal infinite lock, and the seat-back actuator;

FIG. 27 is a diagrammatic view of another display screen shown on the interactive display during use of the vehicle seat showing how the vertical position of the vehicle seat varies according the longitudinal position of the vehicle seat and suggesting that variation from the predetermined curve may be controlled according to various best-fit approximations;

FIG. 28 is a diagrammatic view showing a portion of a process in which a stored arrangement including a vertical position of the vehicle seat is recalled and the controller commands the vehicle seat to move to the stored arrangement;

FIG. 29 is a diagrammatic view showing a portion of a process in which a user moves the vehicles seat manually along the longitudinal path and the controller causes the vertical position of the vehicle seat to move along the predetermined vertical position associated with the longitudinal position of the vehicle seat;

FIG. 30 is a perspective and diagrammatic view of a seat position sensing system including a seat-orientation unit configured to sense an orientation of a vehicle floor and a seat back relative to gravity so that a recline angle for the seat back relative to the vehicle floor may be calculated, and a seat-motion controller configured to move or facilitate manual adjustment of the seat back to predetermined angles of recline stored in the seat-motion controller; and FIG. 315 is a perspective and diagrammatic view of another embodiment of a seat position sensing system in accordance with the present disclosure showing that the seat-orientation unit further includes a linear position sensor coupled to the seat bottom to move therewith and configured to provide measurements used to calculate a longitudinal position of the vehicle seat relative to the vehicle floor.

DETAILED DESCRIPTION

Figure 1A:
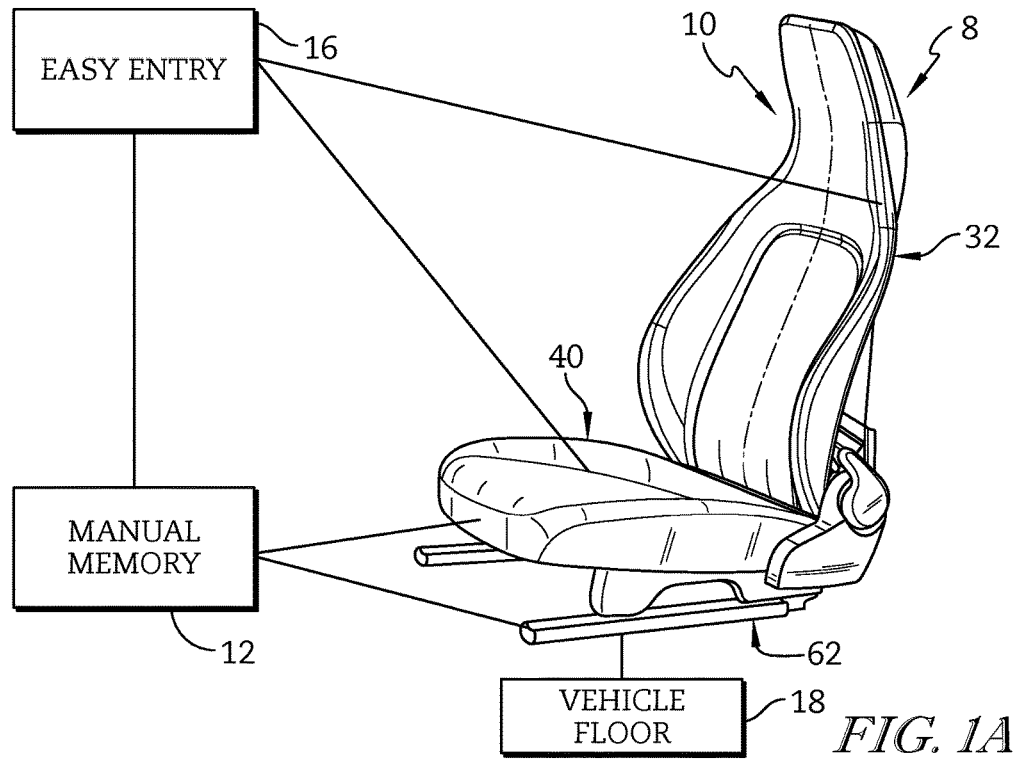
FIG. 1B is a diagrammatic view of the vehicle seat of FIG. 1A showing how the manual memory system is configured to allow a user to move the vehicle seat from a first arrangement associated with a stored memory 1 to a second different arrangement associated with a stored memory 2 without the use of electric motors and using only user-applied force.
Figure 1B:
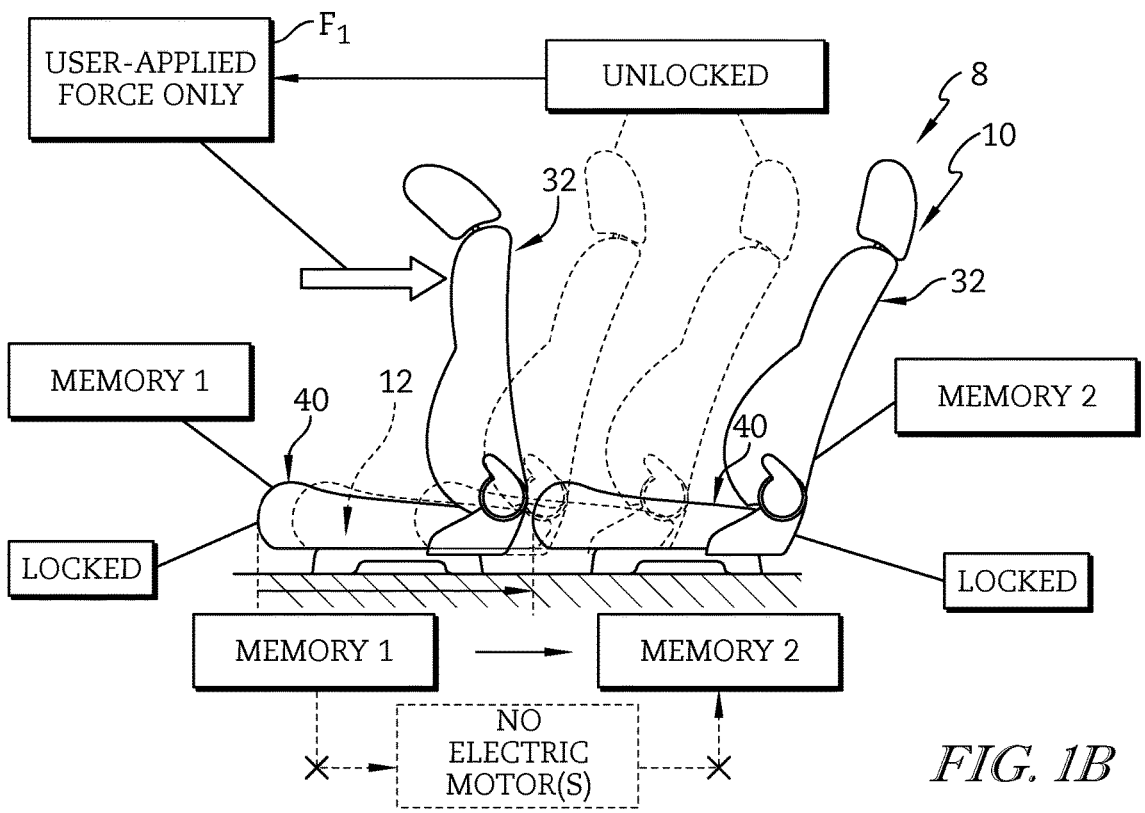
Figure 2:
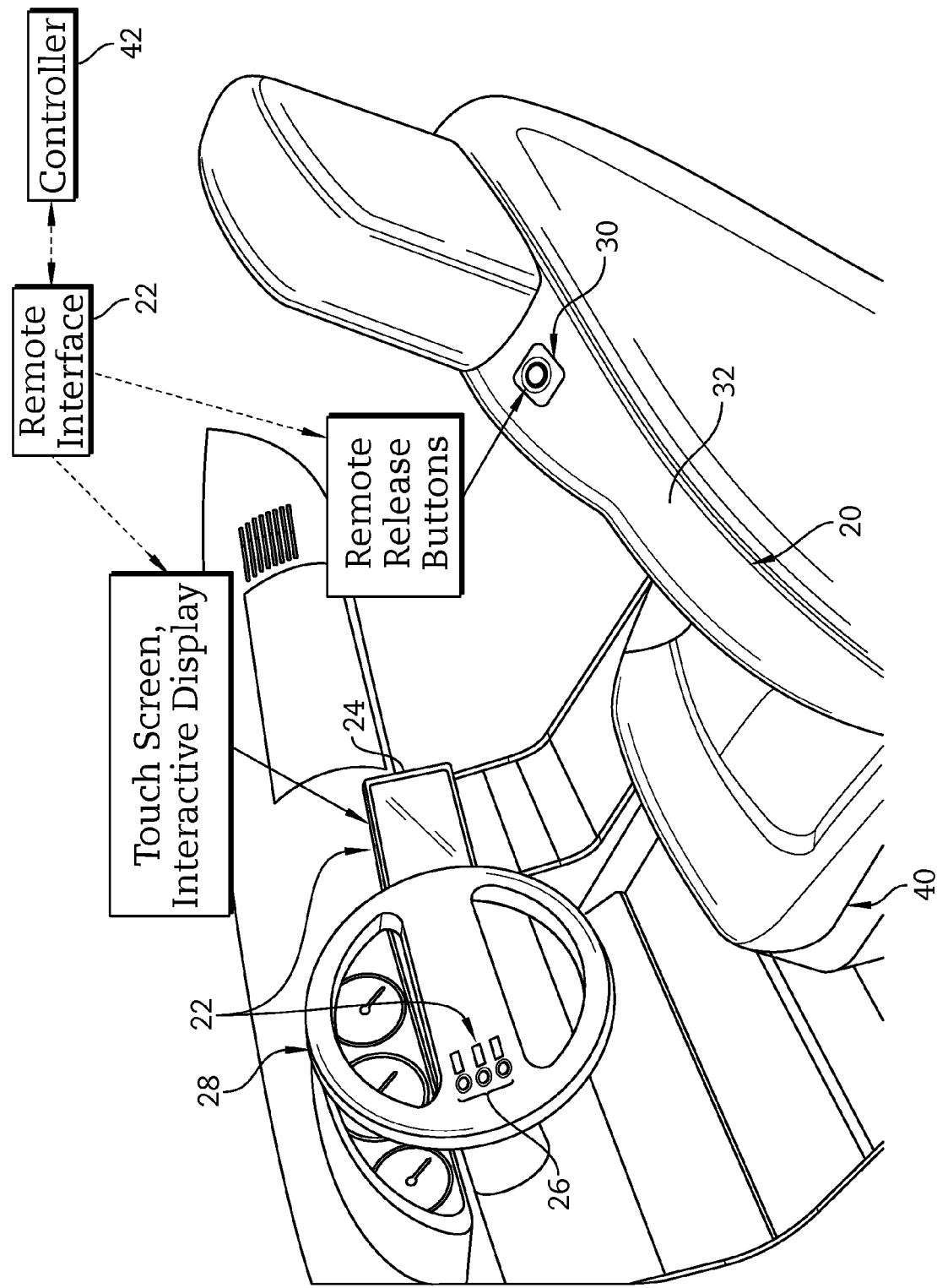
FIG. 2 is a diagrammatic view of an occupant support system including a vehicle seat, a remote interface that includes an interactive display, a first set of remote release buttons coupled to a steering wheel, and another remote release button coupled to a seat back of the vehicle seat.

An occupant support system 8 in accordance with the present disclosure is shown diagrammatically in FIGS. 1A and 1B and illustratively in FIG. 2. Occupant support system 8 includes a vehicle seat 10, a manual-memory system 12, and an easy-entry system 16 as shown in FIG. 1. Manual-memory system 12 is configured to provide infinite adjustment of a longitudinal position of vehicle seat 10 relative to a vehicle floor 18 without the use of powered motors and recall of stored longitudinal positions for use at a later time as suggested in FIGS. 3-16. Easy-entry system 16 is configured to move vehicle seat between a predetermined entry arrangement and one of the previously stored positions as suggested in FIGS. 17-20.

Manual-memory system 12 and easy-entry system 16 are accessed, for example, through use of a remote interface 22 as shown in FIG. 2. Remote interface 22 includes an interactive display 24, a first set of remote release buttons 26 coupled to a steering wheel 28, and another remote release button 30 coupled to a seat back 32 of vehicle seat 10. Interactive display 24 is configured to provide graphical output to a passenger and receive input from the passenger. Interactive display 24, first set of remote release buttons 26, and remote release button 30 may be used to store, wipe, or recall various arrangement of vehicle seat 10.

Manual-memory system 12 is a manual-memory system configured to provide means for adjusting infinitely a longitudinal position of vehicle seat 10 relative to floor 18 without the use of powered motors in response to application of a user-applied force F1 to 10 vehicle seat and locking vehicle seat 10 in a stored position as vehicle seat 10 moves into the stored position as suggested in FIG. 1B. Manual memory system 12 includes a remote-actuation unit 34, a position-sensor unit 36, and a longitudinal infinite lock unit 38 as shown in FIGS. 3 and 4. Remote-actuation unit 34 is configured to provide remote actuation of actuators included in the various systems of vehicle seat 10. Position-sensor unit 36 is configured to sense a longitudinal position of vehicle seat 10, a vertical position of vehicle seat 10, and an angular position of seat back 32 included in vehicle seat 10. Longitudinal infinite lock unit 38 is configured to selectively block movement of vehicle seat 10 relative to the vehicle floor 18 along a longitudinal path at any position along the longitudinal path.

As shown in FIG. 4, manual-memory system 12 further includes a controller 42. Controller 42 is a seat controller included in vehicle seat 10 in one example. In another example, controller 42 is a controller included in the vehicle and not included in any specific vehicle seat or vehicle system. Controller 42 is coupled to remote interface 22 to send and receive information. Controller 42 is further coupled to position-sensor unit 36 to receive sensor data about vehicle seat 10. Controller 42 is also coupled to remote-actuation unit 34 to cause longitudinal infinite lock unit 38 to move between engaged and disengaged positions.

Remote-actuation unit 34 includes remote interface 22, a longitudinal infinite-lock actuator 44, and a seat-back actuator 46 as shown in FIGS. 4, 7, and 12. Remote interface 22 receives signals provided by the passenger and communicates the signals to controller 42. Controller 42 then issues appropriate commands to longitudinal infinite-lock actuator 44 and seat-back actuator 46 to cause vehicle seat 10 to move in desirable ways.

Longitudinal infinite-lock actuator 44 causes longitudinal infinite lock unit 38 to move between the engaged position in which longitudinal movement of vehicle seat 10 is blocked and the disengaged position in which longitudinal movement of vehicle seat 10 is allowed. As suggested in FIGS. 4, 7, and 12, longitudinal infinite-lock actuator 44 is coupled an underside of seat bottom 40 and is coupled to longitudinal infinite lock unit 38 by a pair of Bowden cables 48A, 48B.

Seat-back actuator 46 causes seat back 32 to pivot back and forth relative to a seat bottom 40. Seat-back actuator 46 is coupled to one side of seat back 32 as shown in FIGS. 4 and 26.

Position-sensor unit 36 is coupled to controller 42 and configured to sense the longitudinal position of vehicle seat 10, the vertical position of vehicle seat 10, and the angular position of seat back 32 as various actuators 44, 46 move vehicle seat 10. As suggested in FIGS. 5, 6, 9, and 23, position-sensor unit 36 includes a longitudinal position sensor 50, a seat-back position sensor 52, and a seat-height position sensor 54. Longitudinal position sensor 50 determines the longitudinal position of vehicle seat 10 along the longitudinal path of vehicle seat 10 relative to vehicle floor 18. Seat-back position sensor 52 determines an angular position of seat back 32 relative to seat bottom 40. Seat-height position sensor 54 determines a vertical position of vehicle seat 10 relative to vehicle floor 18.

One example of longitudinal position sensor 50 is shown in FIG. 9. Longitudinal position sensor 50 includes a potentiometer strip 56 coupled in a fixed position to a stationary portion of a slide mechanism 58 included in vehicle seat 10 and a deflector 60 coupled to a moving portion of slide mechanism 58 as shown in FIG. 9. Deflector 60 is configured to engage a portion of potentiometer strip so 56 that absolute location of seat bottom 40 is known. Controller 42 is coupled to longitudinal position sensor 50 to receive a signal therefrom indicative of an absolute position of vehicle seat 10 relative to vehicle floor 18.

One example of seat-back position sensor 52 is shown in FIGS. 5 and 6. Seat-back position sensor 52 is, for example, a rotary potentiometer coupled to an inboard recliner include in seat back 32. In another example, seat-back position sensor 52 is a hall-effect actuator used as seat-back actuator 46. Controller 42 is coupled to seat-back position sensor 52 to receive a signal therefrom indicative of a position of seat back 32 relative to seat bottom 40.

Another example of longitudinal position sensor 50 and seat-back position sensor 52 are two separate accelerometers. Reference is hereby made to U.S. Provisional Application No. 62/063,679 filed Oct. 14, 2014 and entitled SEAT POSITION SENSING AND ADJUSTMENT for disclosure relating to use of accelerometers in vehicles seat, which application is hereby incorporated in its entirety herein.

Longitudinal infinite lock unit 38 is used by a passenger to selectively block or allow translating movement of vehicle seat 10 relative to vehicle floor 18. Longitudinal infinite lock unit 38 allows seat bottom 40 and seat back 32 to move on slide mechanism 58 included in a seat-bottom foundation 62 and be retained at any one of an infinite positions along the longitudinal path as suggested in FIGS. 7-11. Longitudinal infinite lock unit 38 may be used in cooperation with controller 42 and remote-actuation unit 34 or with a manual actuator in which force is applied by the passenger.

Longitudinal infinite lock unit 38 includes a guide rod 64 coupled to slide mechanism 58 in a fixed position, a seat-bottom mount 66 coupled to guide rod 64 to slide back and forth along guide rod 64, and a spring clamp 68 as shown in FIG. 8. Spring clamp 68 is coupled to guide rod 64 to move between an engaged position and a disengaged position. When longitudinal infinite lock unit 38 is in the engaged position, a first friction force engages guide rod 64 to block movement of seat-bottom mount 66 and seat bottom 40 relative to vehicle floor 18. When longitudinal infinite lock unit 38 is in the disengaged position, a relatively smaller second force engages guide rod 64 and allows movement of seat bottom 40 relative to vehicle floor 18. In one illustrative example, spring clamp 68 is a torsion spring and the torsion spring is moved by the associated Bowden cable 48 which is coupled to longitudinal infinite-lock actuator 44.

Longitudinal infinite lock unit 38 allows for the passenger to move vehicle seat 10 and lock it at any location along the longitudinal travel path of vehicle seat 10. Longitudinal infinite lock unit 38 also provides for an enhanced more premium feel to the passenger while maximizing value and minimizing waste. Reference is hereby made to U.S. Provisional Application No. 62/138,516 filed Mar. 26, 2015 and entitled SEAT POSITION SENSING AND ADJUSTMENT for disclosure relating to another longitudinal infinite lock unit, which application is hereby incorporated in its entirety herein.

In one example of use, a passenger selects a preset or stored arrangement of vehicle seat 10 using remote interface 22. The passenger may push one of remote release buttons 26 or touch a graphic displayed on interactive display 24. As shown in FIG. 13, a first graphic 70 is displayed which shows how vehicle seat 10 can be adjusted as a result of engaging preset button 72. As a result of the passenger engaging preset button 72, controller 42 issues commands to remote-actuation unit 34 to cause actuators to move allowing vehicle seat 10 and seat back 32 to move until the preset arrangement is sensed by position-sensor unit 36.

Another graphic 74 which may be displayed on interactive display 24 is shown in FIG. 14. Graphic 74 indicates how buttons on interactive display 24 and remote release buttons 26 may be used.

In one example, controller 42 causes graphics 70, 74 to be displayed on interactive display 24. Controller 42 also stores one or more programs in memory included in controller 42 that are executed by a processor include in controller 42. One example of a partial process 100 is shown in FIG. 15 which is executed by controller 42. Another example of a partial process 200 is shown in FIG. 16 which is executed by controller 42.

Process 100 includes a series of operations which provide an arrangement of vehicle seat 10 that may be stored or discarded by controller 42. Process 100 begins with a capture seat position operation 102 which causes controller 42 to receive signals from position-sensor unit 36. Process 100 then proceeds to simultaneous operations 104, 106, 108 in which longitudinal position sensor 50, seat-back position sensor 52, and seat-height position sensor 54 all provide signals to controller 42. Process 100 then proceeds to operation 110 in which the provided signals are stored in memory as a preset arrangement of vehicle seat 10.

Process 200 includes a series of operations in which the preset arrangement is recalled and the vehicle seat is moved to the preset arrangement as suggested in FIG. 16. Process 200 begins with a recall position operation 202 which causes controller 42 to begin process 200. Process 200 then proceeds to an operation 204 in which controller 42 preset data stored in memory. Next process 200 proceeds to operations 206, 208 in which signals from position-sensor unit 36 are received.

Process 200 then proceeds to an operation 210 to determine if the sensed longitudinal position of the vehicle seat matches the stored longitudinal position. If the positions match, process 200 proceed to operation 212 where longitudinal infinite lock unit 38 remains locked. If the positions do not match, process 200 proceeds to operation 214 in which longitudinal infinite lock unit 38 is unlocked. Process 200 then proceeds to an operation 216 which monitors longitudinal position of the vehicle seat 10 while vehicle seat is moved along the longitudinal path. Process 200 then proceeds to an operation 218 in which the monitored longitudinal location is compared to the stored longitudinal location. If the positions match, process 200 proceed to operation 220 in which longitudinal infinite lock unit 38 is locked in place at the right moment so that vehicle seat 10 is at the stored longitudinal location. If the positions do not match, process 200 proceeds to back to operation 216.

After process 200 receives sensor signal from position-sensor unit 36 in operation 208, process 200 proceeds to an operation 222 in which the sensed seat-back position is compared to the stored seat-back position. If the values agree, process 200 proceeds to an operation 224 in which seat back 32 is locked in place. Process 200 then proceeds to an operation 226 which terminates process 200 when the longitudinal positions also match. If the values do not agree, process 200 proceeds to an operation 228 in which seat back 32 is released to move relative to seat bottom 40. Process 200 then proceeds to an operation 230 in which controller 42 predicts where to lock seat back 32 to cause seat back 32 to be in the stored seat-back position. Process 200 then proceeds to an operation 232 which determines if seat back 32 is in a zone which will allow seat back 32 to be at the stored seat-back position when seat back 32 is locked. If seat back 32 is not in the zone, process 200 proceeds back to operation 232. If seat back 32 is in the zone, process 200 proceeds to an operation 234 in which seat back 32 is locked. Process 200 then proceeds to an operation 236 in which process 200 terminates when vehicle seat 10 is in the stored longitudinal position.

Vehicle seat 10 in accordance with the present disclosure is shown in FIG. 17. Vehicle seat 10 includes easy-entry system 16 configured to configured to move vehicle seat between a predetermined entry arrangement and one of the previously stored positions as suggested in FIGS. 17-20.

Easy-entry system 16 includes remote-actuation unit 34, position-sensor unit 36, seat-height mover 76, and longitudinal infinite lock unit 38 as shown in FIG. 17. In one example use scenario, a rear passenger desires to make entry into a rear passenger seat easier. To do this, the rear passenger engages remote release button 30 included in vehicle seat 10 to cause a signal to be sent to controller 42. As a result, controller 42 immediately frees both longitudinal infinite lock unit 38 and seat-back actuator 46 to move freely in response to application of force by the rear passenger. The rear passenger then applies force to seat back 32 to cause vehicle seat 10 to move to a forward-most position on the longitudinal path and seat back 32 to move a forward most angle so that space between front vehicle seat 10F and rear vehicle seat 10R are maximized as suggested in FIG. 18. Once front vehicle seat 10F is in the predetermined easy-entry arrangement, controller 42 commands both longitudinal infinite lock unit 38 and seat-back actuator 46 to lock in the predetermined easy-entry arrangement. Once rear passenger is seated in rear vehicle seat 10R, the rear passenger engages remote release button 30 causing controller 42 to free both longitudinal infinite lock unit 38 and seat-back actuator 46 to move freely in response to application of force by the rear passenger back to the previous position as suggested in FIG. 19.

Controller 42 includes a process 500 stored in memory for using easy-entry system 16 as suggested in FIG. 28. Process 500 includes a series of operations which provide for use of easy-entry system 16. Process 500 begins with an operation 502 in which controller 42 receives a command from a passenger that causes controller 42 to begin process 500 as shown in FIG. 24.

Process 500 then proceeds to an operation 504 in which position-sensor unit 36 provides sensor data to controller 42 for both longitudinal position and seat-back position for an original arrangement. Process 500 then proceeds down two different paths depending on whether controller 42 is in a sedan mode or a coupe mode.

Starting with the sedan mode, process 500 proceeds to operation 506 which is an identification that controller 42 is in the sedan mode. Process 500 then proceeds to an operation 508 in which controller 42 commands seat-back actuator 46 to free seat back 32 to move freely relative to seat bottom 40. Process 500 then proceeds to an operation 510 in which seat-back position sensor 52 provides a signal indicative of seat-back position to controller 42. Process 500 then proceeds to an operation 512 in which seat back 32 is moved to a forward most position and locked in the forward-most position when seat back 32 reaches the forward most position. Process 500 then proceeds to an operation 514 in which seat back 32 is manually released to move freely. The manual release may be from either engagement directly of seat-back actuator 46 or through engagement of remote release button 30. Process 500 then returns to operation 510.

Process 500 proceeds to an operation 516 instead of operation 510 when seat back 32 is returned to the original arrangement. Process 500 then proceeds to an operation 518 in which the seat-back actuator 46 is locked blocking additional rotation of seat back 32 relative to seat bottom 40.

Starting with the coupe mode, process 500 proceeds to operation 520 which is an identification that controller 42 is in the coupe mode. Process 500 then proceeds to an operation 522 in which controller 42 commands seat-back actuator 46 and longitudinal infinite-lock actuator 44 to free seat back 32 and vehicle seat 10 to move freely. Process 500 then proceeds to an operation 524 in which a time interval passes and controller 42 commands longitudinal infinite-lock actuator 44 to lock blocking movement of vehicle seat 10. Process 500 then proceeds to an operation 526 in which seat-back position sensor 52 provides a signal indicative of seat-back position to controller 42. Process 500 then proceeds to an operation 528 in which seat back 32 is moved to the forward most position and locked in the forward-most position. Process 500 then proceeds to an operation 530 in which seat back 32 is manually released to move freely. The manual release may be from either engagement directly of seat-back actuator 46 or through engagement of remote release button 30. Process 500 then returns to operation 526.

Process 500 proceeds to an operation 532 instead of operation 510 when seat back 32 is returned to the original arrangement. Process 500 then proceeds to an operation 534 in which the seat-back actuator 46 is locked blocking additional rotation of seat back 32 relative to seat bottom 40. Process 500 then proceeds to an operation 536 in which controller 42 commands longitudinal infinite-lock actuator 44 to release allowing vehicle seat 10 to move freely along the longitudinal path. Process 500 then proceeds to an operation 538 in which position-sensor unit 36 provides the longitudinal position to the controller 42. Process 500 then proceeds to an operation 540 in which controller 42 commands longitudinal infinite-lock actuator 44 to lock when the vehicle seat is back at the original longitudinal position.

Another embodiment of a vehicle seat 810 in accordance with the present disclosure is shown in FIGS. 22 and 23. Vehicle seat 810 includes smart-height system 14 configured to provide a predetermined vertical position of vehicle seat 810 relative to vehicle floor 18 associated with each longitudinal location of vehicle seat 10 so that comfort and safety of a passenger are maximized as suggested in FIGS. 22-29.

Smart-height system 14 includes remote-actuation unit 34, position-sensor unit 36, longitudinal infinite lock unit 38, and a seat-height mover 76 as shown in FIGS. 22-24. Remote-actuation unit 34 is configured to provide remote actuation of actuators included in the various systems of vehicle seat 810. Position-sensor unit 36 is configured to sense the longitudinal position of vehicle seat 810, the vertical position of vehicle seat 810, and the angular position of seat back 32. Longitudinal infinite lock unit 38 is configured to selectively block movement of vehicle seat 810 relative to the vehicle floor 18 along the longitudinal path at any position along the longitudinal path. Seat-height mover 76 is configured to provide the predetermined vertical position of vehicle seat 810 relative to vehicle floor 18 associated with each longitudinal location of vehicle seat 810 so that comfort and safety of a passenger are maximized.

Seat-height mover 76 includes a seat-height actuator 78, a seat-height input plate 80, and a seat-height support link 82 as shown in FIG. 24. Seat-height input plate 80 is coupled to seat bottom 40 to pivot back and forth relative to seat bottom 40. Seat-height support link 82 is arranged to extend between and interconnect seat-bottom foundation 62, seat bottom 40, and seat-height input plate 80 as suggested in FIG. 24. Seat-height support link 82 is constrained to pivot on a first end at seat-bottom foundation 62 and at an opposite second end by seat-height input plate 80 and seat bottom 40. Seat-height actuator 78 is illustratively a motor having an output configured to engage and move seat-height input plate 80 so that as seat-height actuator 78 actuates, the vertical position of vehicle seat 810 varies.

Position-sensor unit 36 is coupled to controller 42 and configured to sense the longitudinal position of vehicle seat 10, the vertical position of vehicle seat 810, and the angular position of seat back 32 as various actuators 44, 46, 78 move vehicle seat 810. As shown in FIGS. 24 and 25, position-sensor unit 36 further includes seat-height position sensor 54. Seat-height position sensor 54 in one example is a linear potentiometer coupled to seat-bottom foundation 62 in a fixed position and coupled to seat-height support link 82 to move therewith. In another example, seat-height position sensor 54 is a hall-effect motor included in seat-height actuator 78.

As suggested in FIG. 23, seat-height mover 76 is coupled to controller 42 and is configured to respond to commands from controller 42. Controller 42 includes programming which coordinates vertical and longitudinal movement of vehicle seat 810. Controller 42 determines relative vertical position and longitudinal position using an equation, chart, or table to look up values for one when receiving the other value. In one example, a passenger provides an input to controller 42 which indicates that vehicle seat 810 should be raised relative to vehicle floor 18. As a result, controller 42 causes a graphic 84 to be displayed on interactive display 24 as shown in FIG. 27.

In this use example, passenger has provided a command to controller 42 to cause vehicle seat 810 to raise and move off an optimum-arrangement curve 86 as suggested in FIG. 27. As a result, controller 42 uses one of several best-fit approximations 88, 90, 92, 94 of the new passenger-specific curve 96. Controller 42 may move along these new curves so as to maximize comfort and accommodate the specific preferences of the passenger. While four different curves are shown, any other curves may be used.

In one example, controller 42 causes graphics 70, 74 to be displayed on interactive display 24. Controller 42 also stores one or more programs in memory included in controller 42 that are executed by a processor include in controller 42. One example of a partial process 100 is shown in FIG. 15 which is executed by controller 42. Another example of a partial process 200 is shown in FIG. 16 which is executed by controller 42.

Controller 42 may execute an illustrative process 300 as shown, for example, in FIG. 28. Process 300 includes a series of operations which provide an arrangement of vehicle seat 10 that provides for recall of a vertical position of vehicle seat 810. Process 300 begins with an operation 302 in which seat-position is recalled by a passenger. Process 300 then proceeds to an operation 304 in which controller 42 retrieves a stored preset from memory that includes a stored longitudinal position, a stored vertical position, and a stored seat-back position. Process 300 then proceeds to an operation 306 in which seat-height position sensor 54 provides a signal to controller 42 for comparison to stored vertical position.

Process 300 then proceeds to an operation 308 to determine if the stored vertical position matches the sensed vertical position. If the values agree, process 300 proceeds to an operation 310 in which the vertical position remains unchanged. Process 300 then proceeds to an operation 312 which indicates that the vehicle seat has arrived at the stored preset. If the values do not agree, process 300 proceeds to an operation 314 in which movement of vehicle seat 10 is delayed based on the longitudinal position of vehicle seat 810.

Process 300 then proceeds in parallel to operation 316, 318 based on whether the sensed vertical position is above or below the stored vertical position. If the sensed vertical position is above the stored vertical position, process 300 proceeds to operation 316 and then operation 320 in which seat-height actuator 78 is activated to cause vehicle seat 810 to move down to a lower vertical position. If the sensed vertical position is below the stored vertical position, process 300 proceeds to operation 318 and then operation 322 in which seat-height actuator 78 is activated to cause vehicle seat 810 to move up to a higher vertical position.

Process 300 then proceeds to an operation 324 in which controller 42 monitors seat-height position sensor 54 and calculates a predicted vertical position of vehicle seat 810. Process 300 then proceeds to an operation 326 which determines if the vertical position is in a target zone which causes vehicle seat 810 to be at the stored vertical position if movement of vehicle seat 810 stopped. If the predicted vertical position is in the target zone, process 300 proceeds to an operation 328 which causes seat-height actuator 78 to stop. Process 300 then proceeds to an operation 330 which indicates that vehicle seat 810 is in the stored preset arrangement. If the predicted vertical position is not in the target zone, process 300 returns to operation 324.

Controller 42 may execute an illustrative process 400 as shown, for example, in FIG. 29. Process 400 includes a series of operations which provide an arrangement of vehicle seat 10 that coordinates vertical and longitudinal movement of vehicle seat 810. Process 400 begins with an operation 402 in which controller 42 receives a command from a passenger that causes controller 42 to coordinate the vertical position of vehicle seat 10 with an input longitudinal position of vehicle seat 810 as shown in FIG. 29.

Process 400 then proceeds to an operation 404 in which a passenger manually adjusts a longitudinal position of vehicle seat 810. Process 400 then proceeds simultaneously to three operations 406, 408, 410 associated with the mode of operation of vehicle seat 810. In operation 406, seat height was set initially by the passenger in a manual action. In operation 408, seat height was set initially according to a preset arrangement of the vehicle seat. In operation 410, seat height was set initially according to optimum-arrangement curve 86. If seat height was initially set by either operation 406, 408, process 400 then proceeds to an operation 412 in which longitudinal position sensor 50 provides a sensor signal to controller 42 indicative of the current longitudinal position of vehicle seat 810. Process 400 then proceeds to operation 414 which delays vertical adjustment of vehicle seat 810.

Process 400 then proceeds to an operation 416 in which seat-height position sensor 54 also provides a sensor signal to controller 42 indicative of current vertical position of vehicle seat 810. Process 400 then proceeds to an operation 418 in which controller determines a target height using a table, equation, or a chart as shown in FIG. 27 using current sensed longitudinal position. Process 400 then proceeds to an operation 420 which compares the sensed vertical position with the target vertical position. If the sensed vertical position is above the target vertical position, process 400 proceeds to operation 424 and then operation 426 in which seat-height actuator 78 is activated to cause vehicle seat 810 to move down to a lower vertical position. If the sensed vertical position is below the target vertical position, process 400 proceeds to operation 426 and then operation 428 in which seat-height actuator 78 is activated to cause vehicle seat 810 to move up to a higher vertical position.

Process 400 then proceeds to an operation 430 in which controller 42 monitors seat-height position sensor 54 and calculates a predicted vertical position of vehicle seat 810. Process 400 then proceeds to an operation 432 which determines if the vertical position is in a target zone which causes vehicle seat 10 to be at the target vertical position if movement of vehicle seat 810 is stopped. If the predicted vertical position is in the target zone, process 400 proceeds to an operation 434 which causes seat-height actuator 78 to stop. Process 400 then proceeds to an operation 436 which indicates that vehicle seat 810 is in the target vertical position. If the predicted vertical position is not in the target zone, process 400 returns to operation 428.

Turning to FIG. 30, an illustrative embodiment of a seat position sensing system 600 in accordance with the present disclosure is shown. In some illustrative embodiments, seat position sensing system 600 may calculate a recline angle for a seat back relative to a vehicle floor, and in illustrative embodiments moves or facilitates manual adjustment the seat back to a previously calculated, occupant-preferred recline angle in response to occupant instructions. In some illustrative embodiments, seat position sensing system 600 also calculates a recline angle for a seat back relative to a vehicle floor, and in addition calculates a longitudinal position of the vehicle seat relative to the vehicle floor. Seat position sensing system 600 may further move or facilitate manual adjustment of the seat back to a previously calculated, occupant-preferred recline angle and moves or facilitates manual adjustment of the seat to a previously calculated, occupant-preferred longitudinal position in response to occupant instructions.

Seat position sensing system 600 is used, for example, in a vehicle in connection with a vehicle seat (e.g., such as those disclosed in any of FIGS. 1 and 22) having a seat bottom 625 and a seat back 630. Seat bottom 625 includes a seat foundation 627 anchored to a vehicle floor 635. Seat back 630 extends upwardly from seat bottom 625 and is rotationally movable in relation to seat bottom 625 about pivot axis 695 through either powered or manual mechanisms, as described herein. Variable angles of orientation exist among seat back 630, seat bottom 625, vehicle floor 635, and a reference plane 640. Reference plane 640 provides a measurement reference for variable angles of orientation to be discussed herein, and is established such that a gravity vector (g) extends normal to reference plane 640 as shown in FIG. 30.

Seat position sensing system 600 includes a seat-orientation unit 605 and a seat-motion controller 610. Seat-orientation unit 605 senses orientations of seat back 630 and vehicle floor 635 relative to gravity and communicates these orientations to seat-motion controller 610. Seat-motion controller 610 calculates a vehicle incline angle, an actual seat back recline angle, and an adjusted seat back recline angle relative to the vehicle incline angle. By calculating an adjusted seat back recline angle relative to the vehicle incline angle, seat position sensing system 600 can sense and store a recline angle of seat back 630 in a manner that controls for uneven terrain on which vehicle 643 may drive, such as inclined hills. This allows seat position sensing system 600 to store occupant-preferred recline angles for seat back 630, and to later move or facilitate manual adjustment of seat back 630 to occupant-preferred recline angles, regardless of the terrain on which vehicle 643 is positioned. Seat-orientation unit 605 includes a vehicle orientation sensor 609 and a seat-back sensor 607. Vehicle orientation sensor 609 is configured to sense an orientation of vehicle 643, and in particular vehicle floor 635, relative to gravity. Seat-back sensor 607 is configured to sense an orientation of seat back 630, and in particular a recline angle of seat back 630, relative to gravity.

To sense an orientation of vehicle floor 635 relative to gravity, vehicle orientation sensor 609 includes an accelerometer measuring and outputting accelerations $(\alpha_x)$, $(\alpha_y)$, and $(\alpha_z)$ relative to gravity along three directional axes x, y, and z, as suggested in FIG. 30. Vehicle orientation sensor 609 communicates accelerations $(\alpha_x)$, $(\alpha_y)$, and $(\alpha_z)$ to seat-motion controller 610, which calculates a vehicle incline angle $(\theta_A)$. Vehicle incline angle $(\theta_A)$ represents a variable angle between reference plane 640 and vehicle floor 635. Thus, $(\theta_A)$ may take on smaller values when vehicle 643 is on flat terrain and may take on larger values when vehicle 643 is driving up a hill having a high grade. Accelerations $(\alpha_x)$, $(\alpha_y)$, and $(\alpha_z)$ may be encoded digitally and transmitted with any suitable resolution, and illustratively may be transmitted with 10 bit, or other suitable resolution. Vehicle orientation sensor 609 may discard a certain number of least significant bits, such as the two least significant bits, to suppress noise.

To sense a recline angle of seat back 630 relative to gravity, seat-back sensor 607 includes an accelerometer measuring and outputting accelerations $(\beta_x)$, $(\beta_y)$, and $(\beta_z)$ relative to gravity along three directional axes x, y, and z, as suggested in FIG. 30. Seat-back sensor 607 communicates accelerations $(\beta_x)$, $(\beta_y)$, and $(\beta_z)$ to seat-motion controller 610, which calculates an actual seat back recline angle $(\theta_B)$. Actual seat back recline angle $(\theta_B)$ represents a variable angle between seat back 630 and reference plane 640. Thus, $(\theta_B)$ may take on larger values in situations where seat back 630 is reclined backward, and may also take on larger values when vehicle 643 is positioned on a hill having a high grade. Accelerations $(\beta_x)$, $(\beta_y)$, and $(\beta_z)$ may be encoded digitally and transmitted with any suitable resolution, and illustratively may be transmitted with 10 bit resolution. Seat-back sensor 607 may discard a certain number of least significant bits, such as the two least significant bits, to suppress noise.

Seat-motion controller 610 then subtracts vehicle incline angle $(\theta_A)$ from actual seat back recline angle $(\theta_B)$ to calculate an adjusted seat back recline angle $(\theta_C)$. Adjusted seat back recline angle $(\theta_C)$ represents a variable angle between seat back 630 and vehicle floor 635, as suggested in FIG. 30. As a result, adjusted seat back recline angle $(\theta_C)$ measures the seat back recline angle, controlling for any uneven terrain that vehicle 643 may be driving on, such as an inclined hill. Adjusted seat back recline angle $(\theta_C)$ will take on larger values in situations where seat back 630 reclines backward, but will generally not change when vehicle 643 moves from flat terrain to inclined terrain and vice versa.

By calculating adjusted seat back recline angle $(\theta_C)$, seat positioning system 600 can gauge an amount of seat back recline in a manner that is independent of terrain on which vehicle 643 is driving. This is beneficial because the terrain may vary from one moment to the next, causing variations in the angular orientation of vehicle 643. A vehicle occupant, however, will generally seek a comfortable seat orientation relative to vehicle 643 regardless of angular orientations of vehicle 643. As such, from an occupant comfort perspective, adjusted seat back recline angle $(\theta_C)$ is more relevant than actual seat back recline angle $(\theta_B)$.

Seat-motion controller includes a first angle calculator 650 for calculating vehicle incline angle $(\theta_A)$, a second angle calculator 651 for calculating actual seat back recline angle $(\theta_B)$, and a position calculator 660 for computing adjusted seat back recline angle $(\theta_C)$. To calculate vehicle incline angle $(\theta_A)$, first angle calculator 650 uses mathematical formulae that factor how vehicle incline angle $(\theta_A)$ varies as a function of accelerations $(\alpha_x)$, $(\alpha_y)$, and $(\alpha_z)$, each of which are measured relative to gravity. In this illustrative embodiment, the formula [arctan$((\alpha_x)/(\alpha_z))$] is used to compute $(\theta_A)$, as shown in FIG. 30. Similarly, second angle calculator 651 uses mathematical formulae that factor how actual seat back recline angle $(\theta_B)$ varies as a function of accelerations $(\beta_x)$, $(\beta_y)$, and $(\beta_z)$, each of which are measured relative to gravity. In this illustrative embodiment, the formula [90°+arctan $((\beta_x)/(\beta_z))$] is used to compute $(\theta_B)$.

Position calculator 660 computes adjusted seat back recline angle $(\theta_C)$ as a difference between actual seat back recline angle $(\theta_B)$ and vehicle incline angle $(\theta_A)$—i.e., [$(\theta_B)-(\theta_A)$]. This is because, as explained, adjusted seat back recline angle $(\theta_C)$ represents a recline angle of the seat back 630 relative to an incline angle of the vehicle, which enables the seat position sensing system 600 to control for inclines on which the vehicle may be driving.

Figure 31:
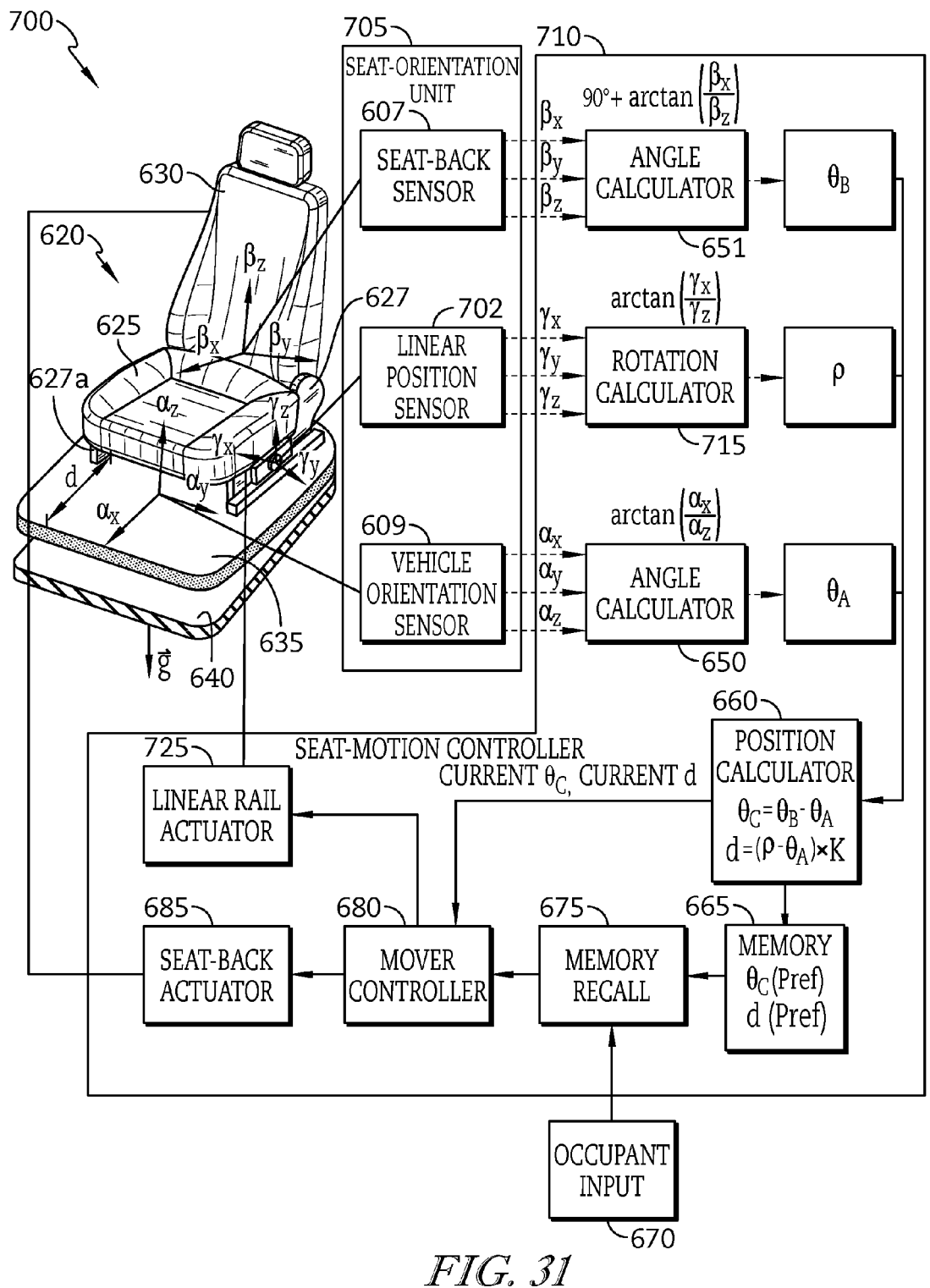

Another embodiment of a seat position sensing system 700 is illustrated in FIG. 31. Seat position sensing system 700 enables the functionality of seat position sensing system 600, and additionally calculates and stores a preferred longitudinal position of vehicle seat 620. Thus, similar to seat position sensing system 600, seat position sensing system 700 calculates an adjusted seat back recline angle $(\theta_C)$ for seat back 630 relative to vehicle floor 635. Additionally, seat position sensing system 700 calculates a longitudinal position (d) of vehicle seat 620, including seat bottom 625, relative to vehicle floor 635. In this illustrative embodiment, longitudinal position (d) is measured from a front end 627a of seat foundation 627 to a reference point on vehicle floor 635 towards the front of the vehicle (e.g., near a gas pedal, not shown). However, other reference points can be used to measure a longitudinal position of vehicle seat 620, including any component in consistent movable relationship with vehicle seat 620 in combination with any component on or affixed to vehicle floor 635.

Seat position sensing system 700 includes a seat-orientation unit 705 and a seat-motion controller 710. Similar to seat-orientation unit 605, discussed above, seat-orientation unit 705 senses an orientation of seat back 630 and an orientation of vehicle floor 635. Seat-orientation unit 705 additionally generates outputs from a linear position sensor 702, which are used to compute longitudinal position (d) of vehicle seat bottom 625. Similar to seat-motion controller 610, discussed above, seat-motion controller 710 calculates a vehicle incline angle, an actual seat back recline angle, and an adjusted seat back recline angle relative to the vehicle incline angle. Seat-motion controller 710 additionally calculates a rotation amount (ρ) of linear position sensor 702, and uses rotation amount (ρ) to calculate a longitudinal position (d) seat bottom 625 relative to vehicle floor 635.

Seat-orientation unit 705 includes several components that correspond to like components described in connection with seat position sensing system 600. Illustratively, seat-orientation unit 705 includes vehicle orientation sensor 609 to sense an orientation of vehicle floor 635 relative to gravity by measuring and outputting accelerations $(\alpha_x)$, $(\alpha_y)$, and $(\alpha_z)$. Seat-orientation unit 705 also includes seat-back sensor 607 configured to sense an orientation of seat back 630 relative to gravity by measuring and outputting accelerations ($\beta_x$), ($\beta_y$), and ($\beta_z$).

Likewise, seat-motion controller 710 includes several components that correspond with components described in connection with seat position sensing system 600. Thus, seat-motion controller 710 includes first angle calculator 650 for calculating vehicle incline angle ($\theta_A$), second angle calculator 651 for calculating actual seat back recline angle ($\theta_B$), and position calculator 660 for computing adjusted seat back recline angle ($\theta_C$). Seat-motion controller 710 also includes memory 665 for storing preferred seat back recline angle ($\theta_C$(pref)), occupant input 670 for receiving occupant inputs, memory recall 675 for retrieving preferred seat back recline angle ($\theta_C$(pref)), and mover controller 680 and seat-back actuator 685 for either powered rotation or to facilitate manual adjustment of seat back 630.

Seat-orientation unit 705 additionally includes linear position sensor 702. Outputs from linear position sensor 702 are used by seat-motion controller 710 to compute longitudinal position (d) of seat bottom 625. To generate outputs from which longitudinal position (d) can be calculated, linear position sensor 702 may include an accelerometer that rotates as seat bottom 625 is moved. The accelerometer may generate outputs that vary based on rotation amount ($\rho$) of the accelerometer. Based on the outputs of the accelerometer, seat-motion controller 710 computes rotation amount ($\rho$), as shown in FIG. 30. Position calculator 660 then converts rotation amount ($\rho$) to longitudinal position (d) based on predetermined mathematical formulae.

It will be understood that the term algorithm or module as used herein does not limit the functionality to particular physical modules, but may include any number of tangible software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

The following numbered clauses include embodiments that are contemplated and non-limiting:

Clause 1. An occupant support system comprising
a vehicle seat including a seat bottom and a seat back coupled to the seat bottom to move relative to the seat bottom,
a foundation adapted to couple the vehicle seat to a floor of a vehicle for movement back and forth relative to the floor, and
a manual-memory system configured to provide means for adjusting infinitely a longitudinal position of the vehicle seat relative to a floor included in a vehicle without the use of powered motors in response to application of a user-applied force to the vehicle seat and locking the vehicle seat in a stored position as the vehicle seat moves into the stored position.

Clause 2. A method of arranging a vehicle seat, the method comprising the steps of
providing a predetermined position of a vehicle seat included in a vehicle,
receiving a user input from a user interface included in a vehicle,
freeing the vehicle seat to move relative to a floor of the vehicle,
moving the vehicle seat relative to the floor without the use of force provided by a powered device and under force applied by a user, and
locking the vehicle seat to block movement of the vehicle seat relative to the floor when the vehicle seat is in the predetermined position.

Clause 3. The occupant support system of any other clause, wherein the manual-memory system includes a position-sensor unit coupled to the vehicle seat to sense a position of the vehicle seat relative to the floor, a longitudinal lock unit coupled to the foundation to move between a locking arrangement in which movement of the vehicle seat back and forth is blocked and a freed arrangement in which the vehicle seat is free to move relative to the floor, and a computer configured to provide means for receiving the position of the vehicle as sensed by the position-sensor unit, determining when the vehicle seat will be in the stored position, and commanding the longitudinal lock unit to engage to block movement of the vehicle seat relative to the floor when the vehicle seat is in the stored position.

Clause 4. The occupant support system of any other clause, wherein the manual-memory system further includes a remote-actuation unit coupled to the longitudinal lock unit and the computer and is configured to receive commands from the computer to cause longitudinal lock to move between the locked and the freed arrangements.

Clause 5. The occupant support system of any other clause, wherein the remote-actuation unit includes remote interface coupled to the computer to receive user input and a longitudinal lock actuator coupled to the computer to receive commands from the computer to cause the longitudinal lock actuator to engage and move the longitudinal lock unit between the locked and freed arrangements.

Clause 6. The occupant support system of any other clause, wherein the computer is further configured to receive a manual release signal from the remote interface and command the longitudinal lock actuator to move the longitudinal lock unit to the freed arrangement in response to receiving the manual release signal.

Clause 7. The occupant support system of any other clause, wherein the computer is further configured to receive a manual engage signal from the remote interface and command the longitudinal lock actuator to move the longitudinal lock unit to the locked arrangement in response to receiving the manual engage signal.

Clause 8. The occupant support system of any other clause wherein the computer is further configured to receive a store signal from the remote interface, determine the position of the vehicle seat when the store signal is received, and store the position in memory included in the computer as the stored position.

Clause 9. The occupant support system of any other clause, wherein the manual-memory system further includes a seat-back lock coupled to the seat bottom and the seat back to move between a blocking arrangement in which movement of the seat back relative to the seat bottom about a pivot axis is blocked and a freeing arrangement in which the seat back is free to pivot relative to the seat bottom and the computer configured is further configured command the seat-back lock to move to the blocking arrangement when the vehicle seat is in the stored position.

Clause 10. The occupant support system of any other clause, wherein the manual-memory system further includes a remote-actuation unit coupled to the longitudinal lock unit, the seat-back lock, and the computer and is configured to receive commands from the computer to cause longitudinal lock to move between the locked and the freed arrangements and the seat-back lock to move between the blocking and the freeing arrangements.

Clause 11. The occupant support system of any other clause, wherein the remote-actuation unit includes remote interface coupled to the computer to receive user input, a longitudinal lock actuator coupled to the computer to receive commands from the computer to cause the longitudinal lock actuator to engage and move the longitudinal lock unit between the locked and freed arrangements, and seat-back lock actuator coupled to the computer to receive commands from the computer to cause the seat-back lock actuator to engage and move the seat-back lock blocking and the freeing arrangements.

Clause 12. The occupant support system of any other clause, wherein the computer is further configured to receive a manual release signal from the remote interface and command the longitudinal lock actuator to move the longitudinal lock unit to the freed arrangement in response to receiving the manual release signal.

Clause 13. The occupant support system of any other clause, wherein the computer is further configured to command seat-back lock actuator to move the seat-back lock to the freeing arrangement in response to receiving the manual release signal.

Clause 14. The occupant support system of any other clause, wherein the computer is further configured to receive a manual engage signal from the remote interface and command the longitudinal lock actuator to move the longitudinal lock unit to the locked arrangement in response to receiving the manual engage signal.

Clause 15. The occupant support system of any other clause, wherein the computer is further configured to command the seat-back lock actuator to move the seat-back lock to the blocking arrangement in response to receiving the manual engage signal.

Clause 16. The occupant support system of any other clause, wherein the computer is further configured to receive a store signal from the remote interface, determine the position of the vehicle seat when the store signal is received, and store the position in memory included in the computer as the stored position.

Clause 17. The occupant support system of any other clause, wherein the position-sensor unit includes a longitudinal position sensor coupled to the vehicle seat and configured to sense a longitudinal position of the vehicle seat relative to the floor.

Clause 18. The occupant support system of any other clause, wherein the longitudinal position sensor is an accelerometer coupled to the seat bottom to move relative to the seat bottom as the seat bottom moves back and forth relative to the floor.

Clause 19. The occupant support system of any other clause, wherein the position-sensor unit further includes a seat-back position sensor coupled to the vehicle seat and configured to sense an angular position of the seat back relative to the seat bottom.

Clause 20. The occupant support system of any other clause, wherein the seat-back position sensor is an accelerometer coupled to the seat back in a fixed position relative to the seat back.

Clause 21. The occupant support system of any other clause, wherein the position-sensor unit further includes a seat-height position coupled to the vehicle seat and configured to sense a height of the seat bottom above the floor of the vehicle.

Clause 22. The occupant support system of any other clause, wherein the seat-height position sensor is an accelerometer coupled to the seat bottom to move relative to the seat bottom.

Clause 23. The occupant support system of any other clause, wherein the computer during the determining operation calculates a velocity of the vehicle seat using the position sensed by the position-sensor unit and calculates a time when to send the command to the longitudinal lock unit to block movement of the vehicle seat to cause the vehicle seat to be in the stored position after the command is sent to the longitudinal lock unit.

Clause 24. The occupant support system of any other clause, wherein the longitudinal lock unit is configured to provide means for blocking selectively movement of the vehicle seat relative to the floor at any position along a predetermined path in response to a first force being applied to the vehicle seat and for limiting movement of the vehicle seat relative to the vehicle floor in response to a second force greater than the first force being applied to the vehicle seat so that vehicle seat may be moved to the stored position in response to application of the user-applied force.

Clause 25. The occupant support system of any other clause, wherein the longitudinal lock unit includes an infinite lock arranged to block movement of the vehicle seat relative to the vehicle floor in response to the first force being applied to the vehicle seat by the occupant during use of the vehicle and an impact-load lock arranged to limit movement of the vehicle seat relative to the vehicle floor in response to the second force load being applied to the vehicle.

Clause 26. The method of any other clause, further comprising the step of sensing a position of the vehicle seat relative to the floor.

Clause 27. The method of any other clause, further comprising the step of determining a velocity of the vehicle seat during the moving step using the position provided during the sensing step and determining when to perform the locking step using the velocity so that the vehicle seat is in the predetermined position when the locking step is performed.

Clause 28. The method of any other clause, further comprising the step of sensing a position of the vehicle seat relative to the floor and storing the position as a stored position.

Clause 29. The method of any other clause, wherein the sensing step and the storing step both occur before the freeing step.

Clause 30. The method of any other clause, wherein the predetermined position is an egress position in which the vehicle seat is moved away from a second vehicle seat located behind the first vehicle seat to maximize space formed therebetween.

Clause 31. The method of any other clause, further comprising the steps of receiving a second user input from the user interface after the locking step, freeing the vehicle seat to move relative to the vehicle floor after the receiving the second user input step, moving the vehicle seat relative to the floor without the use of force provided by a powered device and under force applied by a user, and locking the vehicle seat to block movement of the vehicle seat relative to the floor when the vehicle seat is in the stored position.

Clause 32. The method of any other clause, further comprising the step of unlocking a seat back included in the vehicle seat to pivot relative to a seat bottom included in the vehicle seat, pivoting the seat back relative to the seat bottom without the use of force provided by a powered device and under force applied by the user, and locking the seat back to block movement of the seat back relative to the seat bottom when the vehicle seat is in the stored position.

Clause 33. The method of any other clause, wherein the unlocking step occurs after the locking the vehicle seat step.

Clause 34. The method of any other clause, wherein the unlocking step occurs at the same time as the freeing step.

Clause 35. The method of any other clause, wherein the unlocking step, the pivoting step, and the locking the seat back step occur before the freeing step.

Clause 36. The method of any other clause, further comprising the steps of sensing a position of the vehicle seat relative to the floor before the freeing step and storing the position as a stored position after the sensing step and before the freeing step Clause 37. The method of any other clause, the user input is a predetermined pattern of forces applied to the user interface.

Clause 38. The method of any other clause, wherein the user interface is a force sensor coupled to the vehicle seat and configured to sense force applied to the vehicle seat by the user.

Clause 39. The method of any other clause, wherein the user input is a predetermined pattern of forces applied to the user interface and the predetermined position is a cargo-loading position in which the vehicle seat is moved in a forward direction to maximize storage space for cargo.

Clause 40. The method of any other clause, wherein the predetermined pattern of forces is applied to the vehicle seat by the user using the cargo.

Clause 41. The method of any other clause, further comprising the step of unlocking a seat back included in the vehicle seat to pivot relative to a seat bottom included in the vehicle seat, pivoting the seat back relative to the seat bottom without the use of force provided by a powered device and under force applied by the user, and locking the seat back to block movement of the seat back relative to the seat bottom when the vehicle seat is in the cargo-loading position.

Clause 42. The method of any other clause, wherein the unlocking step occurs after the locking the vehicle seat step.

The invention claimed is:

1. An occupant support system comprising
a vehicle seat including a seat bottom and a seat back coupled to the seat bottom to move relative to the seat bottom,
a foundation adapted to couple the vehicle seat to a floor of a vehicle for movement back and forth relative to the floor, and
a manual-memory system configured to provide means for adjusting infinitely a longitudinal position of the vehicle seat relative to the floor without the use of powered motors in response to application of a user-applied force to the vehicle seat by a user and locking the vehicle seat in a stored position as the vehicle seat moves to the stored position,
wherein the manual-memory system includes a position-sensor unit coupled to the vehicle seat to sense a position of the vehicle seat relative to the floor, a longitudinal lock unit coupled to the foundation to move between a locking arrangement in which movement of the vehicle seat back and forth is blocked and a freed arrangement in which the vehicle seat is freed to move relative to the floor, and a computer configured to provide means for receiving the position of the vehicle as sensed by the position-sensor unit, determining when the vehicle seat will be in the stored position, and commanding the longitudinal lock unit to block movement of the vehicle seat relative to the floor when the vehicle seat is in the stored position,
wherein the computer during the determining operation calculates a velocity of the vehicle seat using the position sensed by the position-sensor unit and calculates a time when to send the command to the longitudinal lock unit to block movement of the vehicle seat to cause the vehicle seat to be in the stored position after the command is sent to the longitudinal lock unit.

2. The occupant support system of claim 1, wherein the manual-memory system further includes a remote-actuation unit coupled to the longitudinal lock unit and the computer and is configured to receive commands from the computer to cause the longitudinal lock unit to move between the locking and the freed arrangements.

3. The occupant support system of claim 2, wherein the remote-actuation unit includes a remote interface coupled to the computer to receive a user input and a longitudinal lock actuator coupled to the computer to receive commands from the computer to cause the longitudinal lock actuator to engage and move the longitudinal lock unit between the locked and freed arrangements.

4. The occupant support system of claim 3, wherein the computer is further configured to receive a manual release signal from the remote interface and command the longitudinal lock actuator to move the longitudinal lock unit to the freed arrangement in response to receiving the manual release signal.

5. The occupant support system of claim 4, wherein the computer is further configured to receive a manual engage signal from the remote interface and command the longitudinal lock actuator to move the longitudinal lock unit to the locking arrangement in response to receiving the manual engage signal.

6. The occupant support system of claim 3, wherein the computer is further configured to receive a store signal from the remote interface, determine the position of the vehicle seat when the store signal is received, and store the position in memory included in the computer as the stored position.

7. The occupant support system of claim 1, wherein the manual-memory system further includes a seat-back lock coupled to the seat bottom and the seat back to move between a blocking arrangement in which movement of the seat back relative to the seat bottom about a pivot axis is blocked and a freeing arrangement in which the seat back is free to pivot relative to the seat bottom and the computer configured is further configured command the seat-back lock to move to the blocking arrangement when the vehicle seat is in the stored position and
wherein the manual-memory system further includes a remote-actuation unit coupled to the longitudinal lock unit, the seat-back lock, and the computer and is configured to receive commands from the computer to cause the longitudinal lock unit to move between the locked and the freed arrangements and the seat-back lock to move between the blocking and the freeing arrangements.

8. The occupant support system of claim 7, wherein the remote-actuation unit includes a remote interface coupled to the computer to receive user input, a longitudinal lock actuator coupled to the computer to receive commands from the computer to cause the longitudinal lock actuator to engage and move the longitudinal lock unit between the locked and freed arrangements, and a seat-back lock actuator coupled to the computer to receive commands from the computer to cause the seat-back lock actuator to engage and move the seat-back lock blocking and the freeing arrangements.

9. The occupant support system of claim 8, wherein the computer is further configured to receive a manual release signal from the remote interface and command the longitudinal lock actuator to move the longitudinal lock unit to the freed arrangement in response to receiving the manual release signal and
wherein the computer is further configured to command the seat-back lock actuator to move the seat-back lock to the freeing arrangement in response to receiving the manual release signal.

10. The occupant support system of claim 8, wherein the computer is further configured to receive a manual release signal from the remote interface and command the longitudinal lock actuator to move the longitudinal lock unit to the freed arrangement in response to receiving the manual release signal and
wherein the computer is further configured to receive a manual engage signal from the remote interface and command the longitudinal lock actuator to move the longitudinal lock unit to the locking arrangement in response to receiving the manual engage signal.

11. The occupant support system of claim 10, wherein the computer is further configured to command the seat-back lock actuator to move the seat-back lock to the blocking arrangement in response to receiving the manual engage signal.

12. The occupant support system of claim 8, wherein the computer is further configured to receive a store signal from the remote interface, determine the position of the vehicle seat when the store signal is received, and store the position in memory included in the computer as the stored position.

13. The occupant support system of claim 1, wherein the position-sensor unit includes a longitudinal position sensor coupled to the vehicle seat and configured to sense the longitudinal position of the vehicle seat relative to the floor,
wherein the longitudinal position sensor is an accelerometer coupled to the seat bottom to move relative to the seat bottom as the seat bottom moves back and forth relative to the floor,
wherein the position-sensor unit further includes a seat-back position sensor coupled to the vehicle seat and configured to sense an angular position of the seat back relative to the seat bottom, and
wherein the seat-back position sensor is an accelerometer coupled to the seat back in a fixed position relative to the seat back.

14. The occupant support system of claim 13, wherein the position-sensor unit further includes a seat-height position sensor coupled to the vehicle seat and configured to sense a height of the seat bottom above the floor of the vehicle and
wherein the seat-height position sensor is an accelerometer coupled to the seat bottom to move relative to the seat bottom.

15. The occupant support system of claim 1, wherein the longitudinal lock unit is configured to provide means for blocking selectively movement of the vehicle seat relative to the floor at any position along a predetermined path in response to a first force being applied to the vehicle seat and for limiting movement of the vehicle seat relative to the floor in response to a second force greater than the first force being applied to the vehicle seat so that the vehicle seat may be moved to the stored position in response to application of the user-applied force and
wherein the longitudinal lock unit includes an infinite lock arranged to block movement of the vehicle seat relative to the floor in response to the first force being applied to the vehicle seat by the user during use of the vehicle and an impact-load lock arranged to limit movement of the vehicle seat relative to the floor in response to the second force being applied to the vehicle.

16. A method of arranging a vehicle seat, the method comprising the steps of
providing a predetermined position of a vehicle seat included in a vehicle,
receiving a user input from a user interface included in the vehicle,
sensing a position of the vehicle seat relative to a floor of the vehicle,
freeing the vehicle seat to move relative to the floor of the vehicle,
moving the vehicle seat relative to the floor without the use of force provided by a powered device and under force applied by a user, and
locking the vehicle seat to block movement of the vehicle seat relative to the floor when the vehicle seat is in the predetermined position,
further comprising the step of determining a velocity of the vehicle seat during the moving step using the position provided during the sensing step and determining when to perform the locking step using the velocity so that the vehicle seat is in the predetermined position when the locking step is performed.

17. The method of claim 16, further comprising the step of storing the position as a stored position and
wherein the sensing step and the storing step both occur before the freeing step.

18. The method of claim 17, wherein the predetermined position is an egress position in which the vehicle seat is moved away from a second vehicle seat located behind the vehicle seat to maximize space formed therebetween.

19. The method of claim 17, further comprising the steps of receiving a second user input from the user interface after the locking step, freeing the vehicle seat to move relative to the floor after the receiving the second user input step, moving the vehicle seat relative to the floor without the use of force provided by a powered device and under force applied by the user, and locking the vehicle seat to block movement of the vehicle seat relative to the floor when the vehicle seat is in the stored position.

20. The method of claim 16, further comprising the steps of sensing a position of the vehicle seat relative to the floor before the freeing step and storing the position as a stored position after the sensing step and before the freeing step and
wherein the user input is a predetermined pattern of forces applied to the user interface and the predetermined position is a cargo-loading position in which the vehicle seat is moved in a forward direction to maximize storage space for cargo.

21. The method of claim 20, wherein the predetermined pattern of forces is applied to the vehicle seat by the user using the cargo.

22. The method of claim 20, further comprising the step of unlocking a seat back included in the vehicle seat to pivot relative to a seat bottom included in the vehicle seat, pivoting the seat back relative to the seat bottom without the use of force provided by a powered device and under force applied by the user, and locking the seat back to block movement of the seat back relative to the seat bottom when the vehicle seat is in the cargo-loading position.

23. The method of claim 22, wherein the unlocking step occurs after the locking the vehicle seat step.

24. A method of arranging a vehicle seat, the method comprising the steps of
   providing a predetermined position of a vehicle seat included in a vehicle,
   receiving a user input from a user interface included in the vehicle,
   sensing a position of the vehicle seat relative to a floor of the vehicle,
   freeing the vehicle seat to move relative to the floor of the vehicle,
   moving the vehicle seat relative to the floor without the use of force provided by a powered device and under force applied by a user, and
   locking the vehicle seat to block movement of the vehicle seat relative to the floor when the vehicle seat is in the predetermined position,
   further comprising the steps of sensing a position of the vehicle seat relative to the floor before the freeing step and storing the position as a stored position after the sensing step and before the freeing step and wherein the user input is a predetermined pattern of forces applied to the user interface,
   wherein the user interface is a force sensor coupled to the vehicle seat and configured to sense force applied to the vehicle seat by the user.

25. The method of claim 24, further comprising the step of unlocking a seat back included in the vehicle seat to pivot relative to a seat bottom included in the vehicle seat, pivoting the seat back relative to the seat bottom without the use of force provided by a powered device and under force applied by the user, and locking the seat back to block movement of the seat back relative to the seat bottom when the vehicle seat is in the predetermined position.

26. The method of claim 25, wherein the unlocking step occurs after the locking the vehicle seat step.

* * * * *